United States Patent
Ooi

(10) Patent No.: US 9,832,039 B2
(45) Date of Patent: Nov. 28, 2017

(54) NETWORK MONITORING METHOD, RELAY DEVICE, AND NETWORK MONITORING SYSTEM

(71) Applicant: FUJITSU LIMITED, Kawasaki-shi, Kanagawa (JP)

(72) Inventor: Masaki Ooi, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 139 days.

(21) Appl. No.: 14/887,792

(22) Filed: Oct. 20, 2015

(65) Prior Publication Data
US 2016/0173296 A1     Jun. 16, 2016

(30) Foreign Application Priority Data

Dec. 12, 2014    (JP) ................................. 2014-251965

(51) Int. Cl.
| | |
|---|---|
| *H04L 12/28* | (2006.01) |
| *H04L 12/437* | (2006.01) |
| *H04B 7/14* | (2006.01) |
| *H04L 12/705* | (2013.01) |
| *H04L 12/721* | (2013.01) |
| *H04B 3/36* | (2006.01) |

(52) U.S. Cl.
CPC ............. *H04L 12/437* (2013.01); *H04B 7/14* (2013.01); *H04L 45/18* (2013.01); *H04B 3/36* (2013.01); *H04L 45/66* (2013.01)

(58) Field of Classification Search
CPC ....... H04L 12/437; H04L 45/18; H04L 45/66; H04B 7/14; H04B 3/36
See application file for complete search history.

(56) References Cited

U.S. PATENT DOCUMENTS

| | | | |
|---|---|---|---|
| 6,813,238 B1 | 11/2004 | Otani et al. | |
| 2006/0045091 A1* | 3/2006 | Hata | H04L 45/18 370/392 |
| 2006/0215583 A1* | 9/2006 | Castagnoli | H04L 45/02 370/254 |
| 2006/0285499 A1* | 12/2006 | Tzeng | H04L 45/18 370/249 |
| 2008/0267081 A1* | 10/2008 | Roeck | H04L 47/10 370/249 |

(Continued)

FOREIGN PATENT DOCUMENTS

| | | |
|---|---|---|
| JP | 2000-183943 | 6/2000 |
| JP | 2012-175184 | 9/2012 |

*Primary Examiner* — Clemence Han
(74) *Attorney, Agent, or Firm* — Staas & Halsey LLP

(57) ABSTRACT

A network monitoring method executed by a plurality of relay devices within a network includes stopping, by a first relay device, transfer of a data frame received via a port at which a loop in the network is detected when the loop is detected; transmitting a first search frame configured to identify one or more relay devices included in a path in which the loop has occurred; receiving, by a second relay device, the first search frame; transmitting a second search frame obtained by storing identifying information identifying the second relay device in a data region of the first search frame; and identifying, by the first relay device, the one or more relay devices included in the loop using information included in the data region of a third search frame generated from the second frame by passing through one or more relay devices, when the third search frame is received.

9 Claims, 21 Drawing Sheets

(56) References Cited

U.S. PATENT DOCUMENTS

| | | | |
|---|---|---|---|
| 2009/0219821 A1* | 9/2009 | Kamachi | H04L 12/437 370/242 |
| 2011/0128863 A1* | 6/2011 | Hsieh | H04L 12/4625 370/249 |
| 2012/0063331 A1* | 3/2012 | Miyazaki | H04L 12/18 370/248 |
| 2012/0166582 A1* | 6/2012 | Binder | H04L 63/18 709/217 |
| 2013/0163596 A1* | 6/2013 | Zhang | H04L 45/74 370/392 |
| 2014/0050099 A1* | 2/2014 | Lin | H04L 41/12 370/241 |

\* cited by examiner

FIG. 6

| PORT | LOOP MONITORING |
|------|-----------------|
| P1a  | ○ |
| P1b  | ○ |
| P1c  | × |
| P1d  | × |

FIG. 12

F1: | DA | SA = MAC_N1 | Type = 0x00AA | MAC_N1 |

F2: | DA | SA = MAC_N1 | Type = 0x00AA | MAC_N1 | MAC_N2 |

F3: | DA | SA = MAC_N1 | Type = 0x00AA | MAC_N1 | MAC_N2 | MAC_N3 |

F4: | DA | SA = MAC_N1 | Type = 0x00AA | MAC_N1 | MAC_N2 | MAC_N3 | MAC_N4 |

FIG. 18

| F21 | DA | SA | 0xA0A0 | TTL=4 | 11:22:33:44:55:01 | | | |
|---|---|---|---|---|---|---|---|---|
| F22 | DA | SA | 0xA0A0 | TTL=3 | 11:22:33:44:55:01 | 11:22:33:44:55:02 | | |
| F23 | DA | SA | 0xA0A0 | TTL=2 | 11:22:33:44:55:01 | 11:22:33:44:55:02 | 11:22:33:44:55:03 | |
| F24 | DA | SA | 0xA0A0 | TTL=1 | 11:22:33:44:55:01 | 11:22:33:44:55:02 | 11:22:33:44:55:03 | 11:22:33:44:55:04 |
| F25 | DA | SA | 0xA0A0 | TTL=1 | 11:22:33:44:55:01 | 11:22:33:44:55:02 | 11:22:33:44:55:03 | 11:22:33:44:55:33 |
| F26 | DA | SA | 0xA0A0 | TTL=1 | 11:22:33:44:55:01 | 11:22:33:44:55:02 | 11:22:33:44:55:03 | 11:22:33:44:55:11 |

NETWORK MONITORING METHOD, RELAY DEVICE, AND NETWORK MONITORING SYSTEM

CROSS-REFERENCE TO RELATED APPLICATION

This application is based upon and claims the benefit of priority of the prior Japanese Patent Application No. 2014-251965, filed on Dec. 12, 2014, the entire contents of which are incorporated herein by reference.

FIELD

The embodiments discussed herein are related to a method of monitoring a network in which frames are transmitted and received.

BACKGROUND

An erroneous coupling of a cable to a relay device such as a switch, a failure in a relay device, or the like may cause a loop in a data link layer in a network. When a loop occurs, the flooding of broadcast frames increases a load on the network, and may lead to a state in which communication is difficult. Accordingly, various methods that detect and suppress a loop have been disclosed.

For example, a cable modem system has been proposed in which a center device generates a loop detecting frame that detects a loop, and determines that a cable modem has detected a loop when the loop detecting frame is supplied from a subscriber side (for example Japanese Laid-open Patent Publication No. 2000-183943 and the like). Further, a loop detecting device has been disclosed which determines that a loop has occurred in a transfer path in a network when there is a receiving port where an amount of traffic of broadcast frames or multicast frames exceeds a threshold value (for example Japanese Laid-open Patent Publication No. 2012-175184 and the like).

Even when the occurrence of a loop in a network is detected, it is difficult to identify a coupling causing the loop. Even analysis of information indicating communication states of all of relay devices in the network can merely estimate locations of occurrence of the loop. When a continuity check is made using a ping command or the like to confirm whether the loop has occurred at locations estimated to be the locations of occurrence of the loop, processing using the ping command causes a loop and frame congestion again. Thus, it is difficult to confirm whether a loop has occurred even when the locations of occurrence of the loop are estimated. From the above, it is desirable to be able to easily identify a path in which a loop has occurred in a network.

SUMMARY

According to an aspect of the embodiment, a network monitoring method executed by a plurality of relay devices within a network, the network monitoring method includes stopping, by a first relay device, transfer of a data frame received via a port at which a loop in the network is detected when the loop is detected; transmitting a first search frame configured to identify one or more relay devices included in a path in which the loop has occurred; receiving, by a second relay device, the first search frame; transmitting a second search frame obtained by storing identifying information identifying the second relay device in a data region of the first search frame; and identifying, by the first relay device, the one or more relay devices included in the loop using information included in the data region of a third search frame in which the first relay device is a transmission source, the third frame being generated from the second frame by passing through one or more relay devices within the network, when the third search frame is received.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a loop monitoring object table;

FIG. 12 is a diagram illustrating an example of a loop search frame;

FIG. 18 is a diagram illustrating an example of a loop search frame;

DESCRIPTION OF EMBODIMENTS

Figure 1:
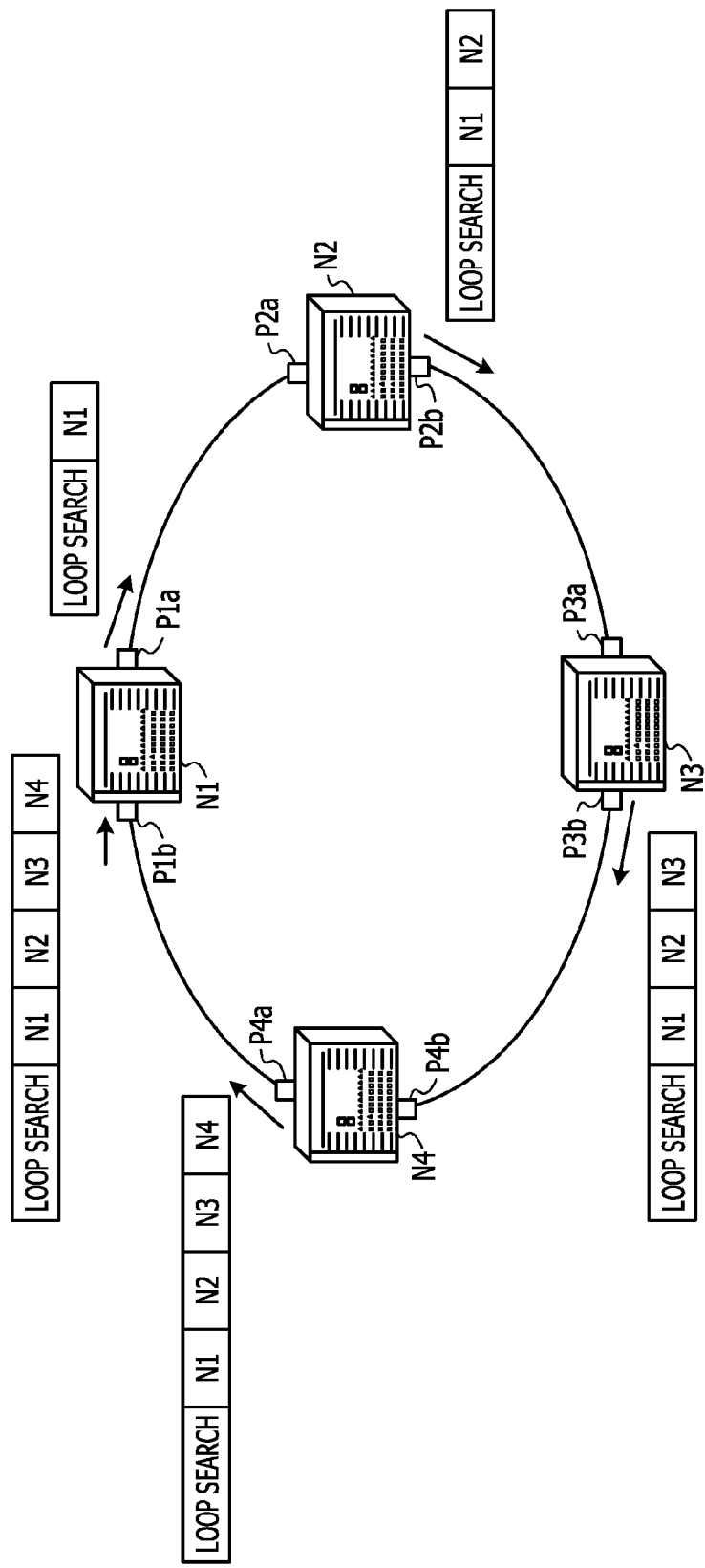
FIG. 1 is a diagram illustrating an example of a communication method according to an embodiment.

FIG. 1 is a diagram illustrating an example of a communication method according to an embodiment. A network illustrated in FIG. 1 includes four relay devices as nodes N1 to N4 coupled to each other in a ring form. None of ports of the relay devices is blocked. The node N1 includes ports P1a and P1b. Similarly, the node N2 includes ports P2a and P2b. The node N3 includes ports P3a and P3b. The node N4 includes ports P4a and P4b.

When the node N1 receives, at the port P1b, a frame transmitted from the port P1a on the network of FIG. 1, the node N1 determines that a loop has occurred. The node N1 then transmits a loop search frame from a port that does not receive the frame used to detect the loop. In the example of FIG. 1, the node N1 transmits the loop search frame from the port P1a. At this time, the node N1 includes identifying information identifying the node N1 in the loop search frame. In the example of FIG. 1, each node uses, as identifying information thereof, an address assigned to the node. The loop search frame therefore includes the address (N1) of the node N1.

The node N2 receives the loop search frame transmitted from the node N1 via the port P2a. When the node N2 determines that the loop search frame is not a frame transmitted from the node N2, the node N2 adds the address (N2) of the node N2 as identifying information identifying the node N2 to the loop search frame. Further, the node N2 transmits the loop search frame after the addition of the address from the port P2b.

When the nodes N3 and N4 receive the loop search frame, the nodes N3 and N4 also perform processing similar to the processing in the node N2. Therefore, the node N3 adds the address (N3) of the node N3 to the loop search frame received from the port P3a, and then transmits the loop search frame from the port P3b. The node N4 adds the address (N4) of the node N4 to the loop search frame received from the port P4b, and then transmits the loop search frame from the port P4a.

The node N1 receives from the port P1b the loop search frame transmitted by the node N4. Then, because the transmission source of the loop search frame is the node N1, the node N1 determines that a loop has occurred in a path passing through the nodes whose identifying information is recorded in the loop search frame.

Thus, in the method according to the embodiment, the device that has detected a loop transmits the loop search frame. Then, a device other than the transmission source of the loop search frame transmits a frame in which the identifying information of the device is added to the received loop search frame. Therefore, locations where a loop has occurred can be identified easily, and communication conditions of a large number of devices in the network do not need to be checked. Because a path in which a loop has occurred can be identified, in a case where the loop has occurred due to a fault at some blocking port, the blocking port at which the fault has occurred can be identified easily. Further, in the relay device that has detected the loop, the port that has received the frame used to detect the loop can be set not to receive frames other than the loop search frame. In that case, the occurrence of frame congestion in the loop due to communication performed for loop path obtainment processing may be prevented.

Figure 2:
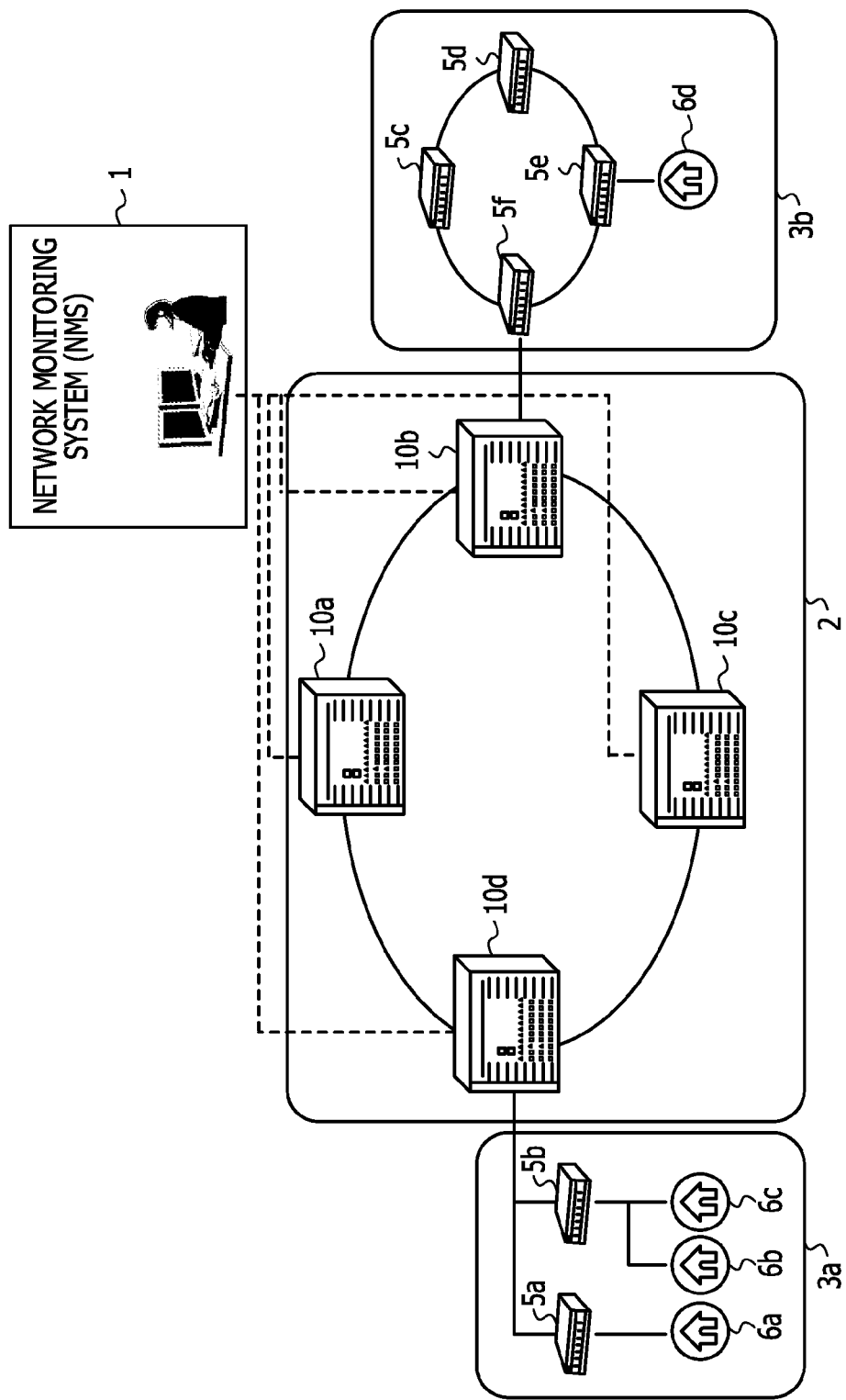
FIG. 2 is a diagram illustrating an example of a system.

FIG. 2 is a diagram illustrating an example of a system. The system may include networks other than a network 2 including a relay device 10 that performs processing using a loop search frame. In the example of FIG. 2, the network 2 is coupled to a network 3a and a network 3b. Relay devices 10 (10a to 10d) in the network 2 are coupled to a network monitoring system (network management system (NMS)) 1 by a control line. The number of devices included in each of the networks illustrated in FIG. 2, the forms of the networks, and the like are an example, and can be changed arbitrarily according to implementation. For example, the network 2 can include an arbitrary number of relay devices 10. The network 2 may be in a form other than a ring form. Similarly, the number of devices included in the network 3a and the network 3b and the forms of the networks can be changed according to implementation. In the example of FIG. 2, the network 3a includes relay devices 5 (5a and 5b) and home networks 6 (6a to 6c). The network 3b includes relay devices 5 (5c to 5f) and a home network 6d. The relay devices 5a and 5b represent an example of a bus type coupling. The relay devices 5c to 5f represent an example of a ring type coupling. The number of home networks 6 coupled to the respective relay devices 5 is also arbitrary.

Figure 3:
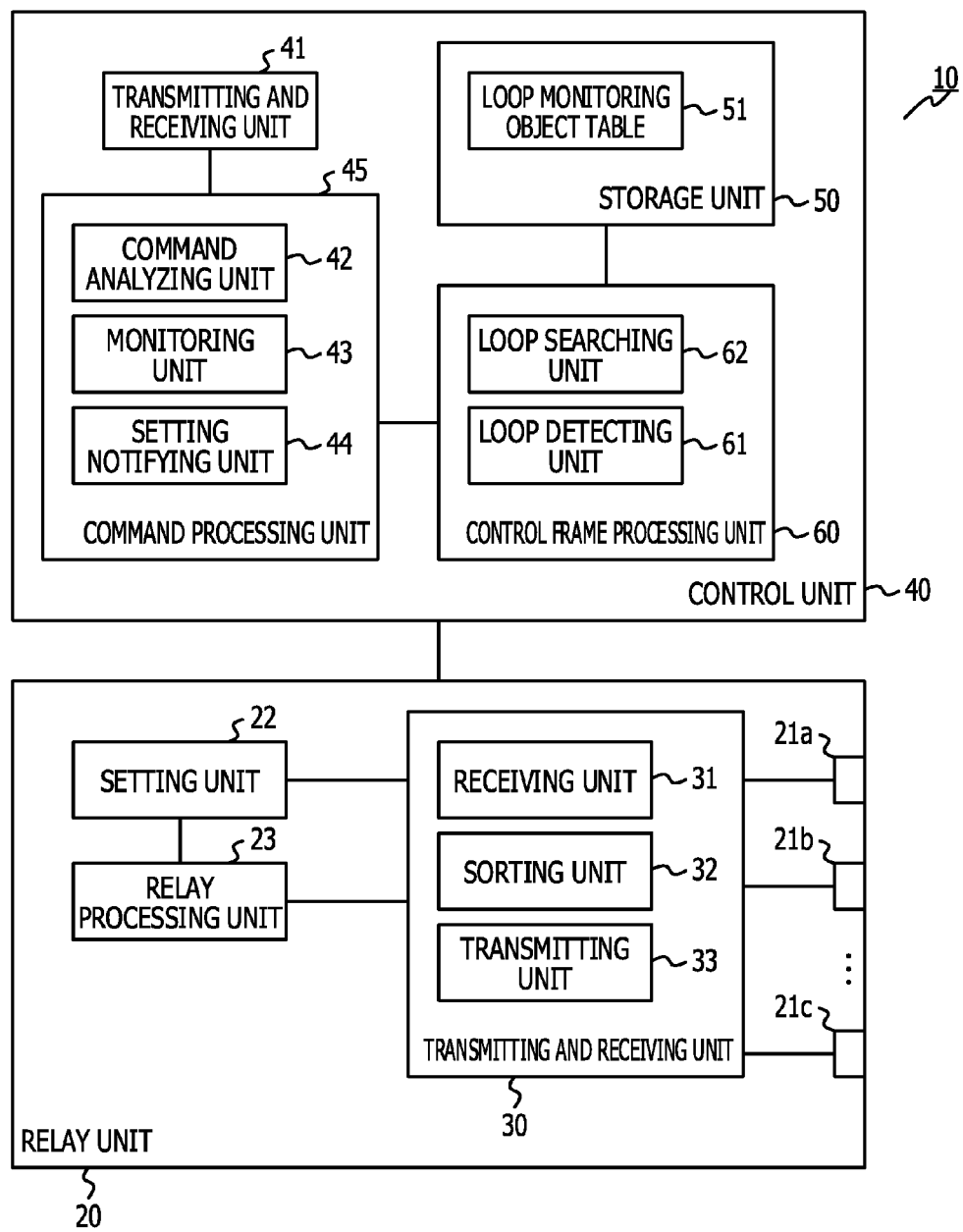
FIG. 3 is a diagram illustrating an example of a configuration of a relay device.

FIG. 3 is a diagram illustrating an example of a configuration of a relay device. The relay device illustrated in FIG. 3 may be the relay device 10 described with reference to FIG. 2. The relay device 10 includes a relay unit 20 and a control unit 40. The relay unit 20 includes ports 21 (21a to 21c), a setting unit 22, a relay processing unit 23, and a transmitting and receiving unit 30. The transmitting and receiving unit 30 includes a receiving unit 31, a sorting unit 32, and a transmitting unit 33. The control unit 40 includes a transmitting and receiving unit 41, a command processing unit 45, a storage unit 50, and a control frame processing unit 60. The command processing unit 45 includes a command analyzing unit 42, a monitoring unit 43, and a setting notifying unit 44. The storage unit 50 stores a loop monitoring object table 51. The control frame processing unit 60 includes a loop detecting unit 61 and a loop searching unit 62. The example of FIG. 3 is illustrated as an example in which the relay device 10 includes three or more ports 21. However, the number of ports 21 possessed by the relay device 10 is arbitrary.

The receiving unit 31 receives frames via the ports 21 (21a to 21c). At this time, the receiving unit 31 identifies from which port 21 each frame is received. The sorting unit 32 outputs a loop monitoring frame among the frames received by the receiving unit 31 to the loop detecting unit 61, and outputs a loop search frame to the loop searching unit 62. Frames including user data (data frames), on the other hand, are output to the relay processing unit 23. The relay processing unit 23 identifies an output destination port using an address table (not illustrated) set by the setting unit 22. The address table associates, for each port, the identifying information of the port with the address of a device coupled to the port. The transmitting unit 33 transmits an input frame from an output destination port.

The transmitting and receiving unit 41 transmits and receives control frames to and from the network monitoring system 1. The command analyzing unit 42 identifies requested processing by analyzing a command in a control frame received from the network monitoring system 1. The monitoring unit 43 monitors the state of each port 21. The setting notifying unit 44 requests the setting unit 22 to perform setting processing for the ports 21, using a result of the analysis in the command analyzing unit 42 and information retained by the monitoring unit 43.

The loop monitoring object table 51 records ports as objects that monitor the occurrence of a loop among the ports 21 provided to the relay device 10. The loop detecting unit 61 generates a loop monitoring frame, and outputs the loop monitoring frame to the transmitting unit 33 together with information on the output port of the loop monitoring frame. At this time, the loop detecting unit 61 makes the loop monitoring frame transmitted from the ports set as the objects that monitor a loop in the loop monitoring object table 51. When the own device receives the loop monitoring frame transmitted from the own device, the loop detecting unit 61 determines that a loop has occurred in the network, and requests the loop searching unit 62 to search for a loop path.

The loop searching unit 62 sets a port 21 detecting the loop to receive a loop search frame but discard other frames. Further, the loop searching unit 62 generates the loop search frame. Then, the loop searching unit 62 designates a port different from the port detecting the loop as a transmitting port, and outputs the loop search frame to the transmitting unit 33.

Figure 4:
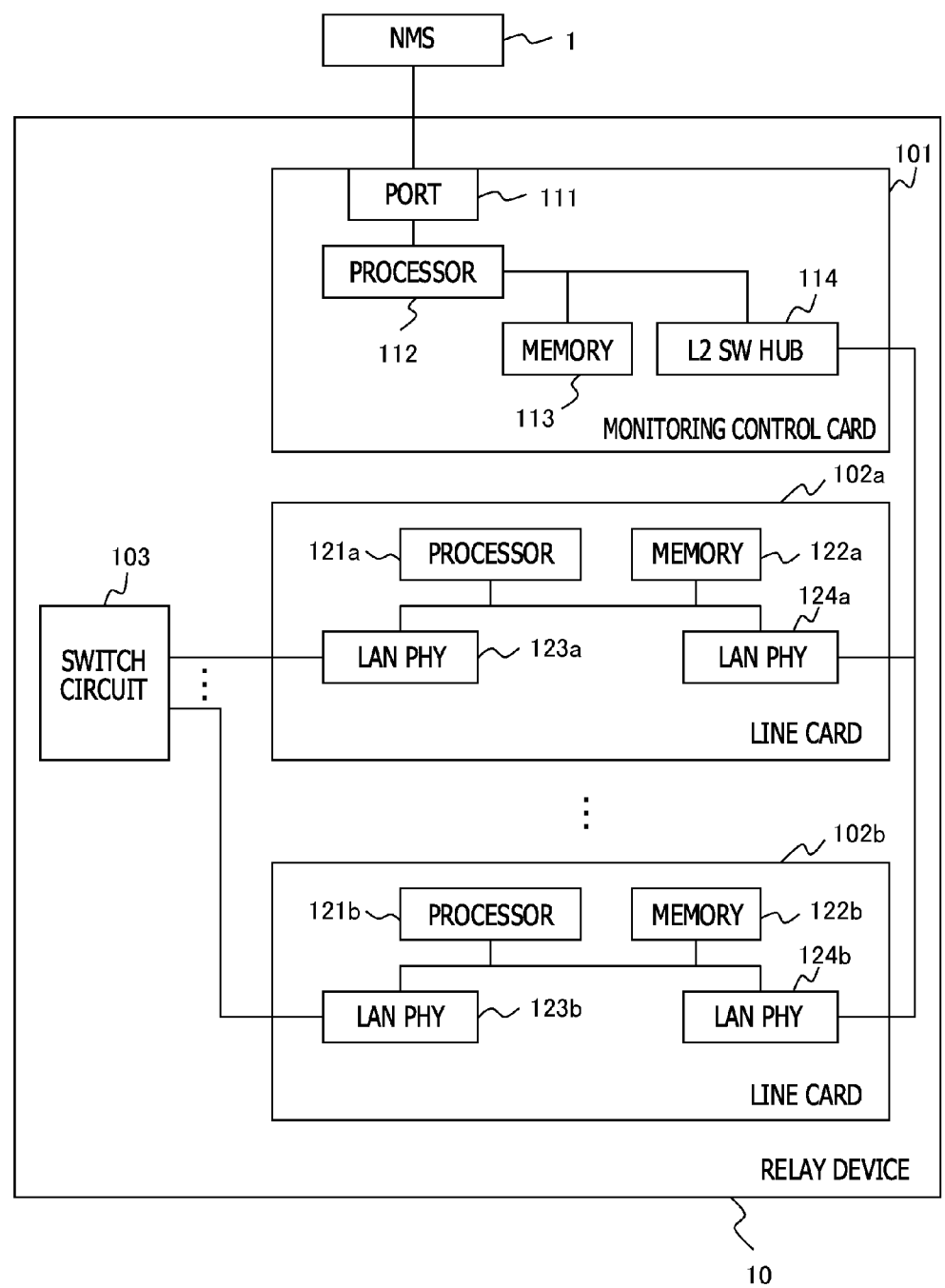
FIG. 4 is a diagram illustrating an example of a hardware configuration of a relay device.

FIG. 4 is a diagram illustrating an example of a hardware configuration of a relay device. The relay device illustrated in FIG. 4 may be the relay device 10 illustrated in FIG. 3. The relay device 10 includes a monitoring control card 101, line cards 102 (102a and 102b), and a switch circuit 103. The monitoring control card 101 includes a port 111, a processor 112, a memory 113, and a layer 2 (L2) switch hub 114, and operates as the control unit 40. The port 111 and the processor 112 implement the transmitting and receiving unit 41. The processor 112 further operates as the command processing unit 45 and the control frame processing unit 60. The memory 113 operates as the storage unit 50. The L2 switch hub 114 establishes coupling between the monitoring control card 101 and the line cards 102 in the relay device 10 so that data can be input and output mutually therebetween.

The line cards 102 include a processor 121, a memory 122, and local area network physical layers (LAN PHYs) 123 and 124. The ports 21 are implemented by the LAN PHY 123. The processor 121 and the LAN PHY 123 operate as the receiving unit 31 and the transmitting unit 33. The processor 121 implements the sorting unit 32, the setting unit 22, and the relay processing unit 23. The memory 122 is used for buffering frames, storing the address table, and the like. The LAN PHY 124 couples the line card 102 to another line card 102 and the monitoring control card 101 so that data can be mutually input and output therebetween.

Each of the processor 112 and the processor 121 can be implemented by an arbitrary circuit including a central processing unit (CPU) or a field-programmable gate array (FPGA). Each of the processor 112 and the processor 121 may be a combination of a plurality of kinds of processing circuits such as a combination of a CPU and an FPGA, or a combination of a plurality of processing circuits of a same kind.

First Embodiment

A first embodiment will hereinafter be described in separate sections on the detection of a loop and a search for a loop path.

Figure 5:
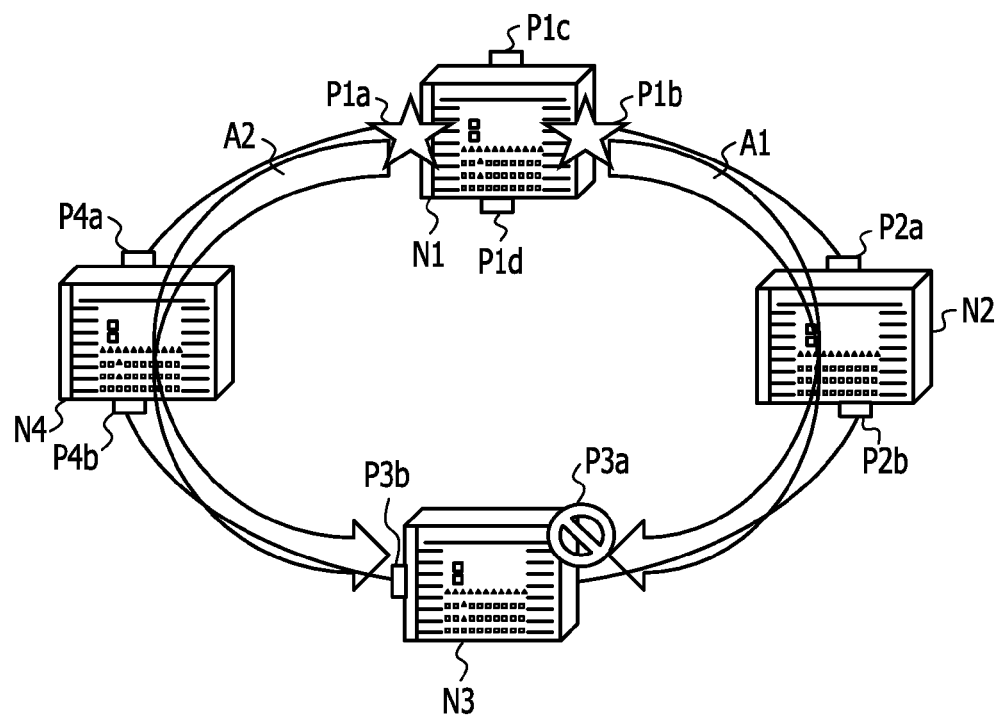
FIG. 5 is a diagram illustrating an example of a network.

FIG. 5 is a diagram illustrating an example of a network. An example of the network before the occurrence of a loop will be described with reference to FIG. 5. Nodes N1 to N4 in FIG. 5 are each a relay device 10. FIG. 5 illustrates an example in which the nodes N1 to N4 are coupled to each other in a ring form. The node N1 includes ports P1a to P1d. The node N2 includes ports P2a and P2b. The node N4 includes ports P4a and P4b. The node N3 includes ports P3a and P3b, and sets the port P3a as a blocking port. Therefore, the node N3 does not transmit, from the port P3b, frames received from the port P3a, and does not transmit, from the port P3a, frames received from the port P3b, either. In the example of FIG. 5, the port P1a and the port P1b are set as loop monitoring ports. The loop monitoring ports are registered in a loop monitoring object table 51 in each relay device 10.

Figure 6:
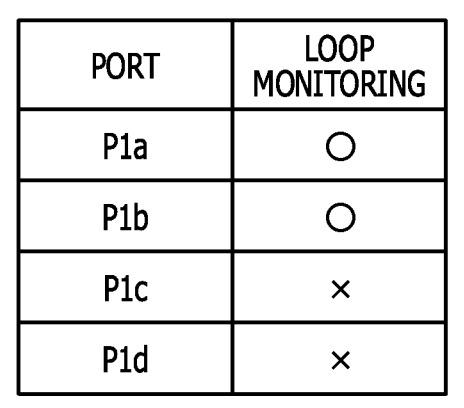

FIG. 6 is a diagram illustrating an example of a loop monitoring object table. The loop monitoring object table illustrated in FIG. 6 may be the loop monitoring object table 51 illustrated in FIG. 3. FIG. 6 represents an example of the loop monitoring object table 51 retained by the node N1 in the network of FIG. 5. The loop monitoring object table 51 records, in association with the identifying information of a port, whether the port is a loop monitoring object. In the example of FIG. 6, the ports P1a and P1b are loop monitoring objects. However, the ports P1c and P1d are not a loop monitoring object.

Hereinafter, in order to clarify a node (relay device 10) that is performing operation, an underscore and a number at the end of the symbol of the node performing operation may be written at the end of a symbol. For example, the loop detecting unit 61 of the node N1 may be denoted as the loop detecting unit 61_1.

In the node N1, the loop detecting unit 61_1 identifies the ports P1a and P1b as loop monitoring ports using the loop monitoring object table 51_1 (FIG. 6). Because the loop monitoring ports are set in the node N1, the loop detecting unit 61_1 periodically generates a loop monitoring frame.

Figure 7:
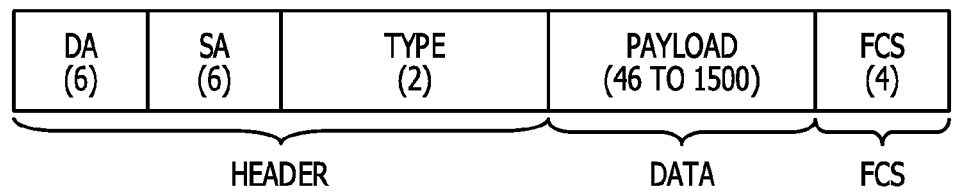
FIG. 7 is a diagram illustrating an example of a format of a loop monitoring frame.

FIG. 7 is a diagram illustrating an example of a format of a loop monitoring frame. The loop monitoring frame includes a header, data (payload), and a frame check sequence (FCS). The header includes a destination media access control (MAC) address (DA), a transmission source MAC address (SA), and a type. Numerical values entered in parentheses in FIG. 7 are the numbers of bytes of respective fields. Hence, the destination MAC address and the transmission source MAC address are each 6 bytes, the type field is 2 bytes, and the FCS is 4 bytes. Further, the data includes a variable length from 46 bytes to 1500 bytes.

The loop monitoring frame has a broadcast address set as the destination MAC address. The transmission source MAC address is the MAC address of the relay device 10 that has generated the loop monitoring frame. The type is an Ethertype value that identifies the loop monitoring frame, and is an arbitrary value that enables the loop monitoring frame to be distinguished from frames of other kinds. The loop monitoring frame includes padding in the data field as appropriate.

The loop detecting unit 61_1 outputs the generated loop monitoring frame to the transmitting unit 33_1 together with information indicating that the output ports of the loop monitoring frame are the ports P1a and P1b. The transmitting unit 33_1 transmits the loop monitoring frame from the ports P1a and P1b.

An arrow A1 in FIG. 5 indicates the transmission path of the loop monitoring frame transmitted from the port P1b of the node N1. The loop monitoring frame transmitted from the port P1b of the node N1 is received by the node N2. The receiving unit 31_2 of the node N2 outputs the loop monitoring frame received via the port P2a to the sorting unit 32_2. The sorting unit 32_2 outputs the loop monitoring frame to the loop detecting unit 61_2. The loop detecting unit 61_2 determines whether or not the transmission source MAC address of the loop monitoring frame is the address assigned to the node N2. In this case, the transmission source address of the loop monitoring frame received by the node N2 is the address of the node N1. Therefore, the loop detecting unit 61_2 determines that no loop is detected, and requests the transmitting unit 33_2 to broadcast the loop monitoring frame. The loop monitoring frame is broadcast from the node N2 by the processing of the transmitting unit 33_2.

The node N3 receives the loop monitoring frame via the port P3a. In this case, the node N3 sets the port P3a as a blocking port. The node N3 therefore does not transmit the loop monitoring frame received via the port P3a to another device. Also in the node N3, the loop detecting unit 61_3 obtains the loop monitoring frame via the receiving unit 31_3 and the sorting unit 32_3. The loop detecting unit 61_3 determines that no loop is detected because the transmission source MAC address of the loop monitoring frame is different from the address assigned to the node N3.

An arrow A2 in FIG. 5 indicates the transmission path of the loop monitoring frame transmitted from the port P1a of the node N1. The node N4 broadcasts the loop monitoring frame received from the node N1. The node N3 therefore receives the loop monitoring frame via the port P3b. The node N4 performs processing similar to the processing in the node N2 which processing has been described with reference to the arrow A1. The node N3 includes the port P3a other than the port P3b. However, the port P3a is a blocking port. The node N3 therefore does not broadcast the loop monitoring frame. In this case, the node N3 performs processing similar to the processing performed when the node N3 receives the loop monitoring frame transmitted from the port P1b of the node N1. Thus, the network illustrated in FIG. 5 includes the nodes N1 to N4 coupled to each other in a ring form. However, no loop has occurred.

Figure 8:
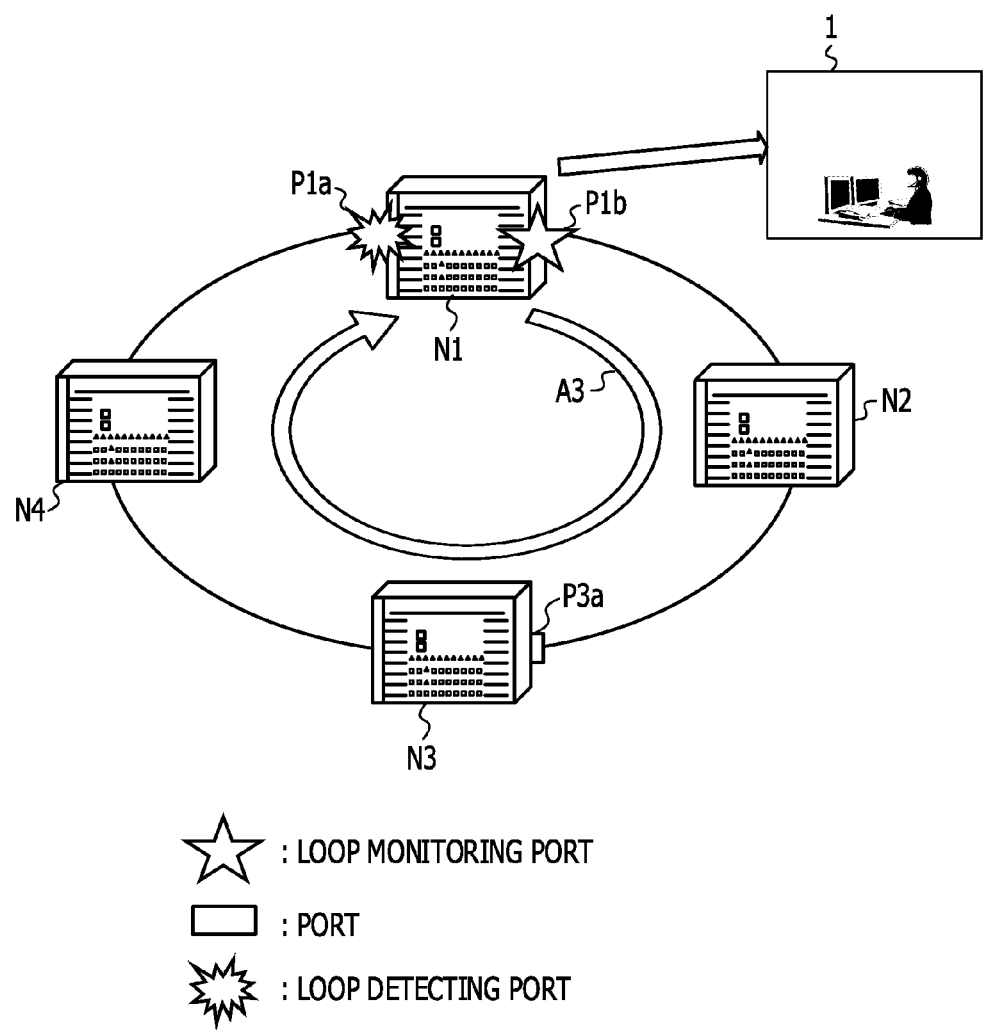
FIG. 8 is a diagram illustrating an example of detection of a loop.

FIG. 8 is a diagram illustrating an example of detection of a loop. Suppose that the blocking at the port P3a of the node N3 is released during operation of the network in FIG. 5. A cause of the releasing of the blocking at the port P3a is arbitrary. In FIG. 8, the port P3a is represented by a quadrangle to indicate that the port P3a is not a blocking port.

After the blocking at the port P3a is released, the node N3 broadcasts the loop monitoring frame received via the port P3a. In this case, the node N3 has received, via the port P3a, the loop monitoring frame transmitted from the port P1b of the node N1. Hence, the node N4 receives, from the node N3, the loop monitoring frame transmitted from the port P1b of the node N1, and the node N4 also broadcasts the loop monitoring frame. The node N1 therefore receives, from the port P1a, the loop monitoring frame transmitted from the port P1b of the node N1 (arrow A3 in FIG. 8). The receiving unit 31_1 of the node N1 outputs the loop monitoring frame received via the port P1a to the sorting unit 32_1. The sorting unit 32_1 outputs the loop monitoring frame to the loop detecting unit 61_1. The loop detecting unit 61_1 determines that a loop is detected because the transmission source MAC address of the input loop monitoring frame is the address assigned to the node N1. The port that receives the frame used to detect the loop may hereinafter be described as a "loop detecting port."

After determining that the loop is detected, the loop detecting unit 61_1 notifies the monitoring unit 43_1 of the loop detecting port and the occurrence of the loop. The monitoring unit 43_1 generates a control frame that notifies the occurrence of the loop to a network monitoring system 1, and transmits the generated control frame to the network monitoring system 1 via the transmitting and receiving unit 41 (arrow A4 in FIG. 8).

Further, in order to converge the loop, the loop detecting unit 61_1 discards the loop monitoring frame used to detect the loop. In order to discard frames input from the port P1a as the loop detecting port, the loop detecting unit 61_1 requests the setting unit 22_1 to shut down the loop detecting port (port P1a). The setting unit 22_1 shuts down the port P1a. The loop is thus resolved. The loop detecting port may be linked down as processing that discards frames input from the loop detecting port.

Figure 9:
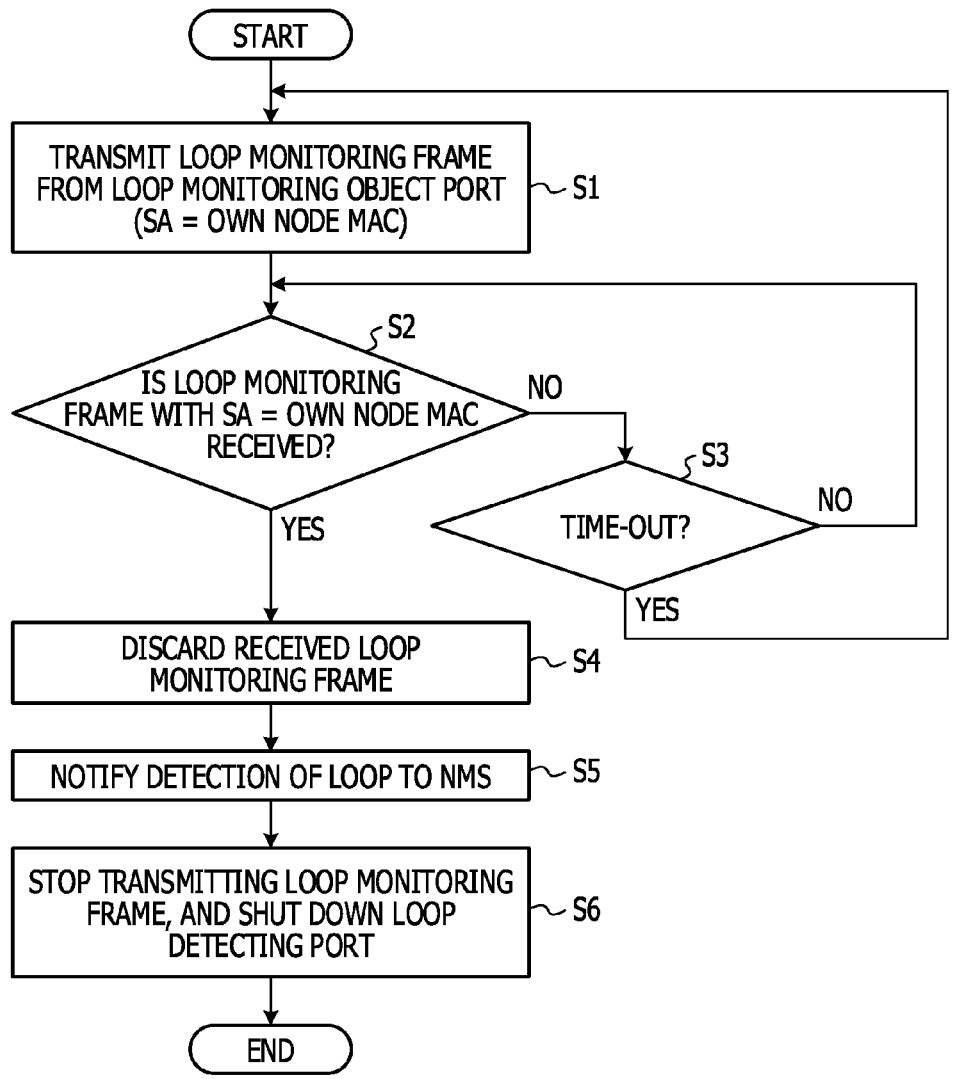
FIG. 9 is a flowchart illustrating an example of a method of detecting a loop.

FIG. 9 is a flowchart illustrating an example of a method of detecting a loop. FIG. 9 illustrates an example of processing performed in the relay device 10 that transmits a loop monitoring frame. In the drawing, the transmission source MAC address is described as SA for ease of viewing of the figure.

The loop detecting unit 61 performs processing that transmits a loop monitoring frame from the loop monitoring object ports (S1). At this time, the loop detecting unit 61 sets the transmission source MAC address of the loop monitoring frame to the MAC address of the own node. The loop detecting unit 61 thereafter determines whether the loop monitoring frame whose transmission source MAC address coincides with the MAC address assigned to the own node (own node MAC) is received (S2). The loop detecting unit 61 continues the determination in S2 until the transmission cycle of the loop monitoring frame has passed or until the loop monitoring frame whose transmission source MAC address coincides with the MAC address of the own node is received (No in S2 and S3). In FIG. 9, the passage of the transmission cycle of the loop monitoring frame is described as a "time-out." In a case where the loop monitoring frame whose transmission source MAC address is set to be the MAC address of the own node is not received before the transmission cycle of the loop monitoring frame has passed, the loop detecting unit 61 returns to S1 (Yes in S3).

When the loop monitoring frame whose transmission source MAC address is set to be the MAC address assigned to the own node is received, on the other hand, the loop detecting unit 61 determines that a loop is detected (Yes in S2). Accordingly, the loop detecting unit 61 discards the received loop monitoring frame (S4). When the loop detecting unit 61 notifies the monitoring unit 43 of the occurrence of the loop, the monitoring unit 43 notifies the network monitoring system 1 that the loop is detected (S5). The loop detecting unit 61 stops the transmission of the loop monitoring frame, and requests the setting unit 22 to shut down the loop detecting port (S6). The setting unit 22 resolves the loop by shutting down the loop detecting port.

After the loop detecting unit 61 in the relay device 10, which has detected the loop, completes the detection of the loop and the shutting down of the loop detecting port, the loop detecting unit 61 notifies the loop searching unit 62 that the loop is detected, together with information on the loop detecting port and the transmission port of the loop monitoring frame. The loop searching unit 62 generates a loop search frame.

Figure 10:
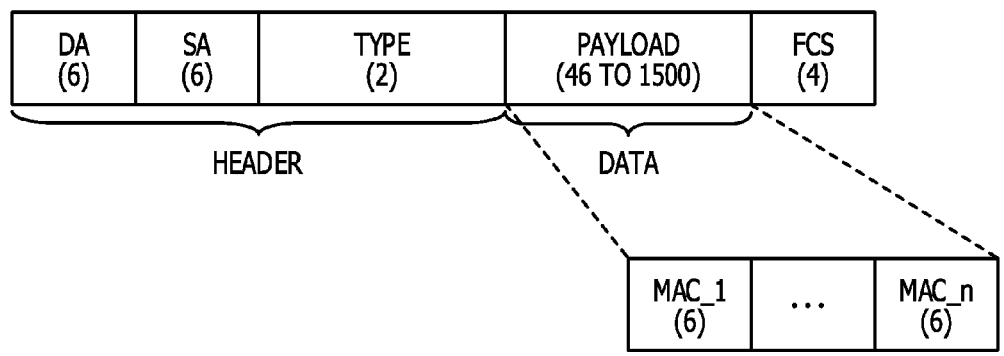
FIG. 10 is a diagram illustrating an example of a format of a loop search frame.

FIG. 10 is a diagram illustrating an example of a format of a loop search frame. The loop search frame includes a header, data (payload), and an FCS. Information elements included in the header and the FCS of the loop search frame are similar to the information elements included in the header and the FCS of the loop monitoring frame. The value of a type field of the loop search frame is a value determined in advance to identify the loop search frame. In the first embodiment, the value of the type of the loop search frame is set at 0x00AA.

The loop search frame includes an arbitrary number of MAC addresses in the payload. The MAC addresses in the payload are MAC addresses assigned to relay devices 10 that process the loop search frame. As will be described later, when each relay device 10 receives the loop search frame not generated by the own node from another device, the relay device 10 adds the MAC address of the own node to the payload. Therefore, the relay device 10 that receives the loop search frame generated by the own node from another device can identify a loop path using the information of the payload.

Figure 11:
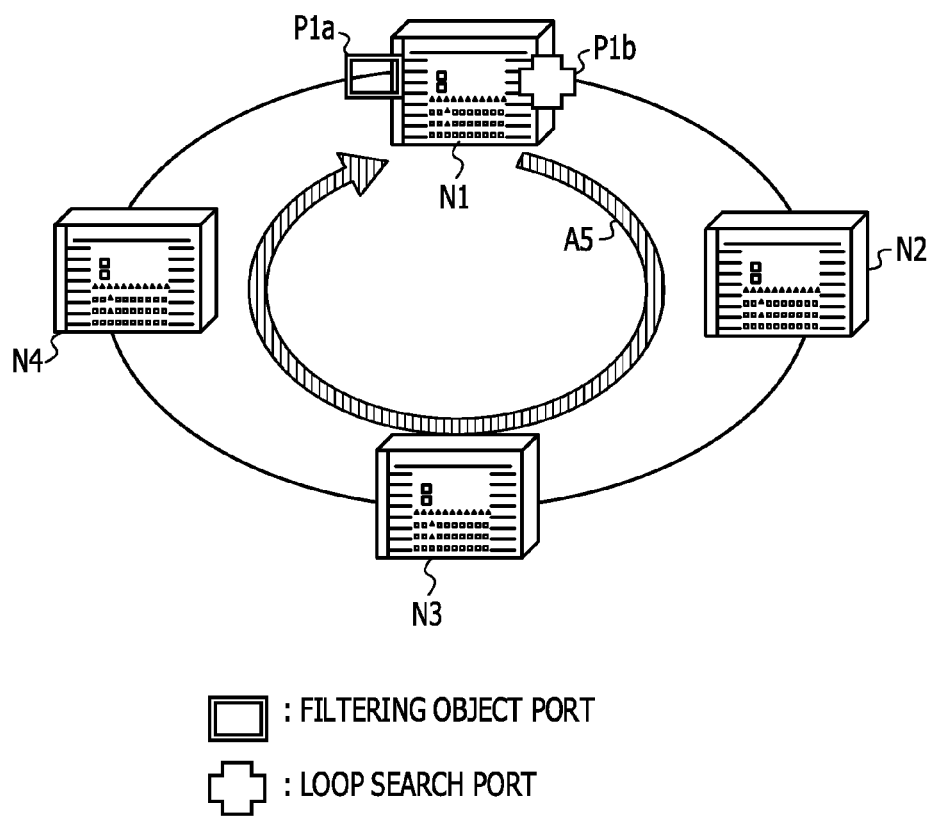
FIG. 11 is a diagram illustrating an example of port settings when a loop search is made.

FIG. 11 is a diagram illustrating an example of port settings when a loop search is made. Description in the following will be made by taking as example a loop search made after the loop illustrated in FIG. 8 is detected. The loop searching unit 62_1 of the node N1 sets the port (P1*b*) that transmitted the loop monitoring frame at the time of detection of the loop as the transmission port of the loop search frame. The loop searching unit 62_1 requests the setting unit 22_1 to make settings so as to receive the loop search frame from the loop detecting port (port P1*a*) and discard other frames. The setting unit 22_1 sets the port P1*a* according to the request from the loop searching unit 62_1. As a result, the frame input via the port P1*a* which frame has a type=0x00AA is an object of reception processing, whereas other frames are discarded. Therefore, after the node N1 transmits the loop search frame from the port P1*b*, the node N1 can receive the loop search frame through the loop in the network, the loop being represented by an arrow A5 in FIG. 11.

The port set so as to receive the loop search frame and discard other frames may hereinafter be described as a "filtering object port." The port that transmits the loop search frame in which the address of the own device is set as the transmission source MAC address may be described as a "loop search port."

FIG. 12 is a diagram illustrating an example of a loop search frame. The processing of the loop search frame will be described with reference to FIG. 11 and FIG. 12. After setting the filtering object port (P1*a*), the loop searching unit 62_1 generates a loop search frame F1 (FIG. 12). As indicated by F1 in FIG. 12, a transmission source MAC address (SA) in the loop search frame F1 generated by the loop searching unit 62_1 is the address of the node N1 (MAC_N1). The loop searching unit 62_1 outputs the loop search frame F1 to the transmitting unit 33_1 together with information that designates the port P1*b* as an output port. The transmitting unit 33_1 transmits the loop search frame F1 from the port P1*b*. Therefore, as indicated by the arrow A5 in FIG. 11, the loop search frame F1 is transmitted from the node N1 to the node N2.

When the receiving unit 31_2 of the node N2 receives the loop search frame F1, the receiving unit 31_2 outputs the loop search frame F1 to the sorting unit 32_2. Because the type of the input frame is set to 0x00AA, the sorting unit 32_2 outputs the loop search frame F1 to the loop searching unit 62_2. The loop searching unit 62_2 determines whether the transmission source MAC address of the loop search frame F1 is the address assigned to the node N2. In this case, the transmission source address of the loop search frame F1 is the address of the node N1. The loop searching unit 62_2 therefore adds the MAC address (MAC_N2) of the node N2 to the data in the loop search frame F1. A loop search frame F2 (FIG. 12) is therefore obtained by the processing of the loop searching unit 62_2. The loop searching unit 62_2 requests the transmitting unit 33_2 to broadcast the loop search frame F2. The loop search frame F2 is broadcast from the node N2 by the processing of the transmitting unit 33_2. Hence, the node N3 receives the loop search frame F2 from the node N2.

The processing performed when the node N3 receives the loop search frame F2 is similar to the processing performed when the node N2 receives the loop search frame F1. Because the transmission source MAC address of the loop search frame F2 is not the address assigned to the node N3, the loop searching unit 62_3 adds the MAC address (MAC_N3) of the node N3 to the data in the loop search frame F2. A loop search frame F3 (FIG. 12) is therefore obtained by the processing of the loop searching unit 62_3. Further, the loop searching unit 62_3 requests the transmitting unit 33_3 to broadcast the loop search frame F3. Hence, the node N4 receives the loop search frame F3 from the node N3.

The node N4 also performs processing similar to the processing performed when the node N2 and the node N3 receive the loop search frame. That is, because the transmission source MAC address of the loop search frame F3 is not the address assigned to the node N4, the loop searching unit 62_4 adds the MAC address (MAC_N4) of the node N4 to the data in the loop search frame F3. A loop search frame F4 (FIG. 12) is generated by this processing. The loop search frame F4 is thereafter broadcast from the node N4.

Because the port P1*a* of the node N1 is a filtering object port, the port P1*a* does not discard the frame in which the value of the type field is the value (0x00AA) indicating the loop search frame among frames that arrive at the port P1*a*. As illustrated in FIG. 12, the value of the type field of the loop search frame F4 is 0x00AA. The loop search frame F4 is therefore received by the node N1. The loop searching unit 62_1 obtains the loop search frame F4 via the receiving unit 31_1 and the sorting unit 32_1. The loop searching unit 62_1 determines whether the transmission source MAC address of the loop search frame F4 is the address assigned to the node N1. In this case, the transmission source address of the loop search frame F4 is the address of the node N1. The loop searching unit 62_1 determines that the loop search frame whose transmission source address is set to be the address of the node N1 is a frame transmitted to the node N1 through the loop path. Information on each relay device 10 that processed the loop search frame is included in the payload of the loop search frame. The loop searching unit 62_1 accordingly determines that the devices whose addresses are included in the payload of the loop search frame F4 are included in the loop. The loop searching unit 62_1 outputs the information in the payload of the loop search frame F4 to the monitoring unit 43_1. The monitoring unit 43_1 generates a frame that notifies the information notified from the loop searching unit 62_1. The monitoring unit 43_1 then transmits the frame to the network monitoring system 1 via the transmitting and receiving unit 41.

Therefore, an operator of the network monitoring system 1 identifies the loop occurring in the network using the information notified from the node N1, and performs setting processing that resolves the loop. When a command to make a setting that resolves the loop is input from the transmitting and receiving unit 41 to the command analyzing unit 42, the command analyzing unit 42 analyzes the command. The setting notifying unit 44 requests the setting unit 22 to make a port setting as appropriate using a result of the analysis of the command analyzing unit 42 and information retained by the monitoring unit 43.

In the above example, description has been made of a case where the loop search frame is transmitted from the port that is the transmission port of the loop monitoring frame and which is not the loop detecting port. However, the loop search frame may be transmitted from yet another port. An example in this case will be described with reference to FIG. 13.

Figure 13:
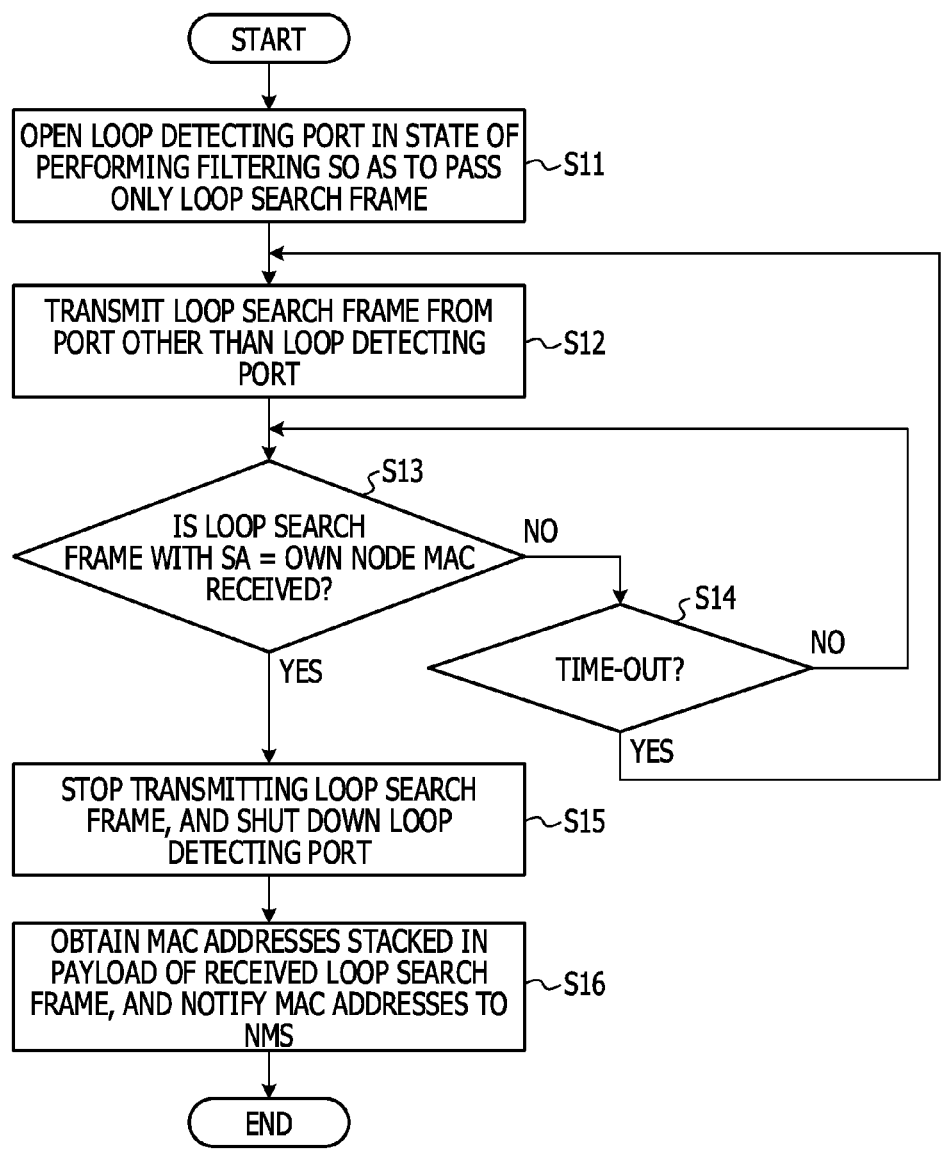
FIG. 13 is a flowchart illustrating an example of operation of a relay device that generates a loop search frame.

FIG. 13 is a flowchart illustrating an example of operation of a relay device that generates a loop search frame. The relay device described with reference to FIG. 13 may be the relay device 10 illustrated in FIG. 3. The processing illustrated in FIG. 13 is processing in the relay device 10 that detects the loop, and corresponds to the processing performed in the node N1 in FIG. 11. In FIG. 13, changes such as an interchange of the order of S15 and S16, for example, may be made.

First, notified that the loop is detected, the loop searching unit 62 sets the loop detecting port to perform filtering so as to receive only the loop search frame, and then opens the loop detecting port (S11). Next, the loop searching unit 62 transmits the loop search frame from a port other than the loop detecting port (S12). In this case, the transmission source MAC address of the loop search frame is the address assigned to the relay device 10 that generates the loop search frame. The loop searching unit 62 thereafter determines whether or not the loop search frame whose transmission source MAC address coincides with the MAC address assigned to the own node (own node MAC) is received (S13). The loop searching unit 62 continues the determination in S13 until the transmission cycle of the loop search frame has passed or until the loop search frame whose transmission source MAC address coincides with the MAC address assigned to the own node is received (No in S13 and S14). In FIG. 13, the passage of the transmission cycle of the loop search frame is expressed as a "time-out." In a case where the loop search frame whose transmission source MAC address is set to be the MAC address of the own node is not received before the transmission cycle of the loop search frame has passed, the loop searching unit 62 determines that a time-out has occurred (Yes in S14), and returns to S12.

Receiving the loop search frame whose transmission source MAC address is set to be the MAC address of the own node means that the loop searching unit 62 has obtained a list of relay devices 10 included in the loop by the loop search frame (Yes in S13). The loop searching unit 62 stops transmitting the loop search frame, and requests the setting unit 22 to shut down the loop detecting port (S15). The setting unit 22 shuts down the loop detecting port. Next, the loop searching unit 62 notifies address information included in the payload of the loop search frame to the monitoring unit 43. Notified of the address information, the monitoring unit 43 notifies the network monitoring system 1 of the list of the relay devices 10 included in the loop (S16).

Figure 14:
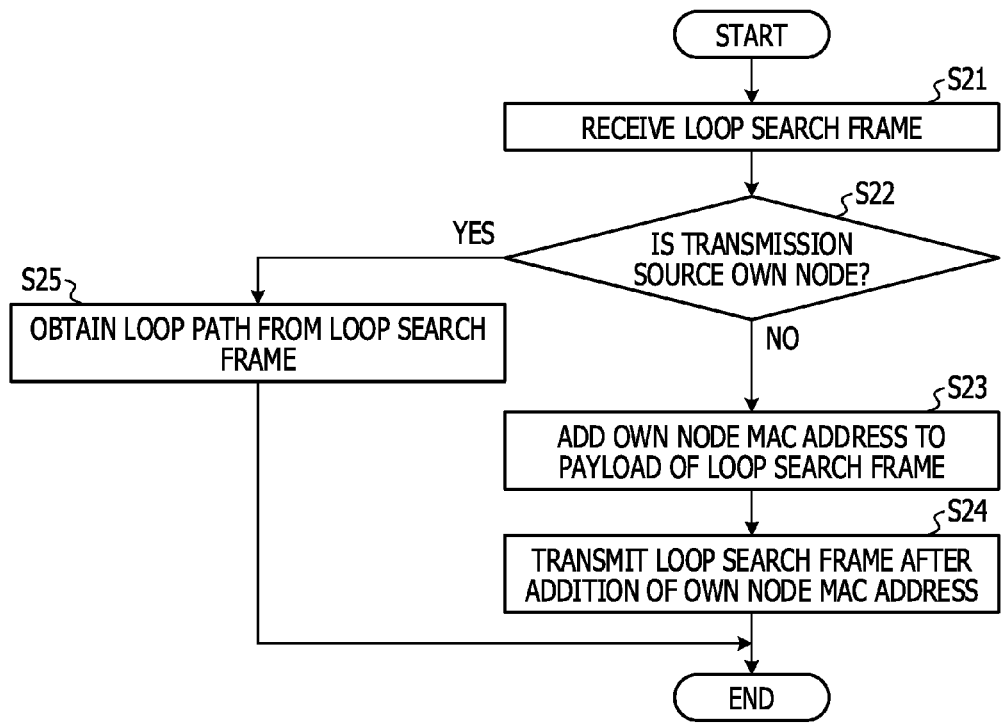
FIG. 14 is a flowchart illustrating an example of operation of a relay device that receives a loop search frame.

FIG. 14 is a flowchart illustrating an example of operation of a relay device that receives a loop search frame. The relay device described with reference to FIG. 14 may be the relay device 10 illustrated in FIG. 3. First, the loop searching unit 62 receives the loop search frame (S21). Next, the loop searching unit 62 determines whether or not the transmission source of the loop search frame is the own node (S22). When determining that the transmission source of the loop search frame is not the own node (No in S22), the loop searching unit 62 adds the MAC address of the own node to the payload of the loop search frame (S23). The relay device 10 next transmits the loop search frame after the addition of the MAC address of the own node (S24).

When determining that the transmission source of the loop search frame is the own node (Yes in S22), on the other hand, the loop searching unit 62 obtains information on relay devices 10 included in the loop path from the payload of the loop search frame (S25). The processing performed in S25 is as described above with reference to S15 and S16 in FIG. 13.

Thus, in the first embodiment, the information on the relay devices 10 included in the loop path can be obtained easily by using the loop search frame. Hence, the locations of the loop can be identified more efficiently and accurately than in the case where the locations where the loop has occurred are predicted by checking the communication conditions of a large number of devices in the network. When the loop has occurred due to a fault at some blocking port, the blocking port at which the fault has occurred can be identified easily on the basis of the loop path.

Further, in the relay device that detects the loop, the loop detecting port performs filtering so as not to receive frames other than the loop search frame. The device as the transmission source of the loop search frame obtains the information on the relay devices 10 included in the loop path from the loop search frame transmitted by the own device, and thereafter discards the loop search frame. Thus, congestion due to the loop search frame may also be prevented. Hence, even when the port is linked up for loop path obtainment processing, frame congestion in the loop may be prevented.

Second Embodiment

In a second embodiment, description will be made by taking as example a case where a loop has also occurred in other than a shortest loop path including a relay device that searches for the loop path. A method of detecting the loop is similar to the method of the first embodiment. One or more of relay devices included in each ring network can monitor the occurrence of a loop and identify devices included in the loop that has occurred as in the case of a node N1 in the following description. In order to facilitate understanding, the following description will be made while attention is directed to flows of a loop monitoring frame and a loop search frame transmitted from the node N1. However, a relay device other than the node N1 can also perform loop monitoring and the identification of devices in a loop path in a manner similar to the node N1.

Figure 15:
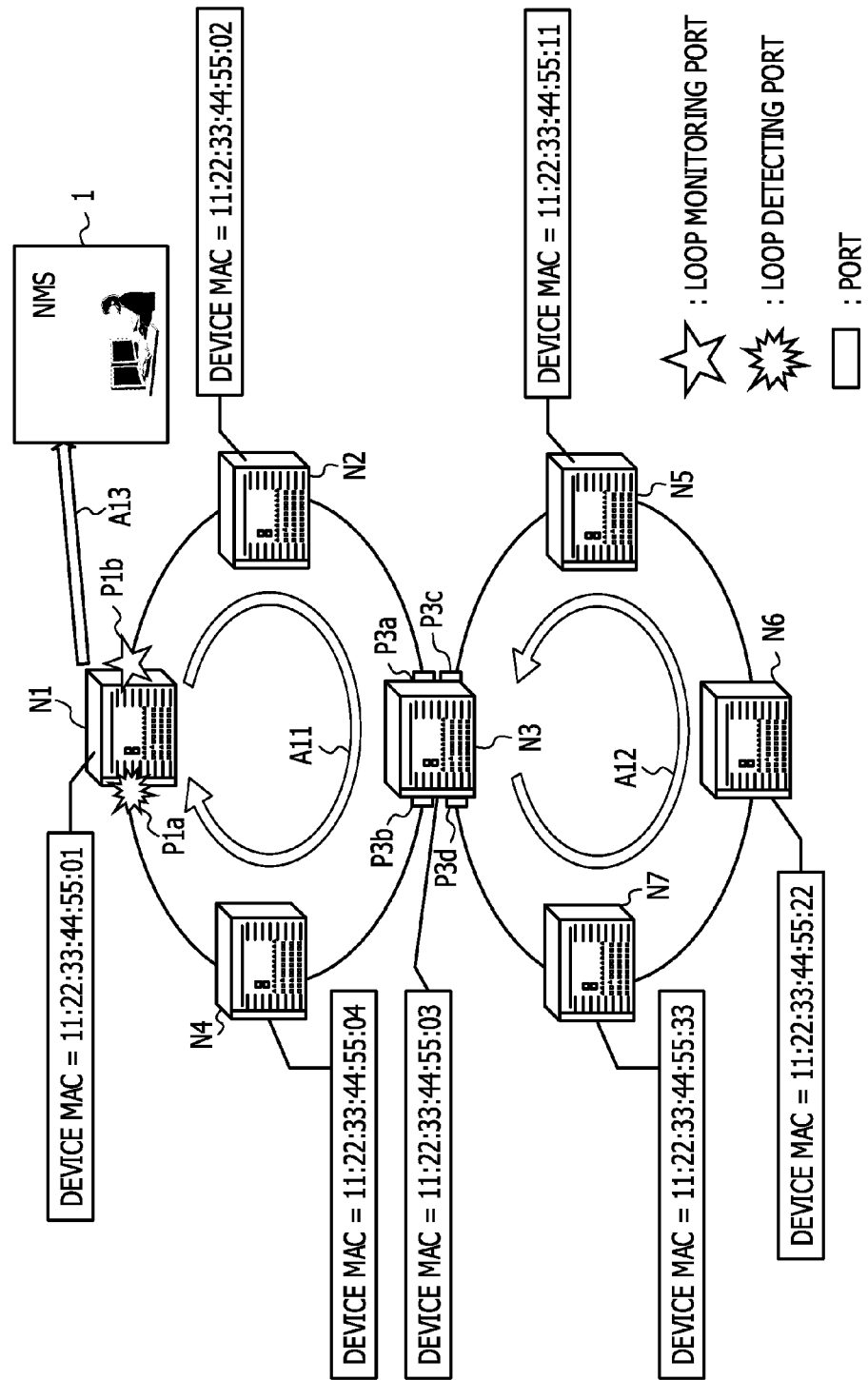
FIG. 15 is a diagram illustrating an example of detection of a loop in a second embodiment.

FIG. 15 is a diagram illustrating an example of detection of a loop in the second embodiment. A network illustrated in FIG. 15 includes nodes N1 to N4 coupled to each other in a ring form. Further, the node N3 and nodes N5 to N7 are also coupled to each other in a ring form. The node N3 includes four ports, that is, ports P3a to P3d. The ports P3a and P3b are used for communication in the network in a ring form which network includes the nodes N1 to N4. The ports P3c and P3d of the node N3 are used for communication in the network in a ring form which network includes the node N3 and the nodes N5 to N7. In the second embodiment, MAC addresses assigned to the nodes N1 to N7 are as illustrated in FIG. 15. Each of the nodes N1 to N7 is the relay device 10 described with reference to FIG. 3, FIG. 4, and the like. In an initial state, the ports P3a and P3c of the node N3 are set as blocking ports. Therefore, no loop has occurred.

The ports P3a and P3c of the node N3 are thereafter opened due to some factor. FIG. 15 illustrates an example of a transmission path of a loop monitoring frame when the loop monitoring frame is transmitted from the port P1b of the node N1 after the ports P3a and P3c are opened. In the ring type network including the nodes N1 to N4, the blocking ports no longer exist, and thus a loop occurs. Then, the frame transmitted from the port P1b of the node N1 arrives at the port P1a of the node N1 (arrow A11 in FIG. 15). After the loop monitoring frame received by the port P3a of the node N3 is transmitted from the port P3d of the node N3, the loop monitoring frame arrives at the port P3c of the node N3 from the node N3 via the node N7, the node N6, and the node N5 (arrow A12 in FIG. 15). FIG. 15 is simplified for ease of viewing of the figure. However, the loop monitoring frame received by the port P3a of the node N3 is also transmitted from the port P3c, and thus the node N3 and the nodes N5 to N7 have another loop occurring in an opposite direction from the arrow A12.

When the node N1 receives the loop monitoring frame, the node N1 determines that a loop is detected by processing similar to the processing in the first embodiment. Therefore, as indicated by an arrow A13, the detection of the loop is notified from the node N1 to a network monitoring system 1.

Figure 16:
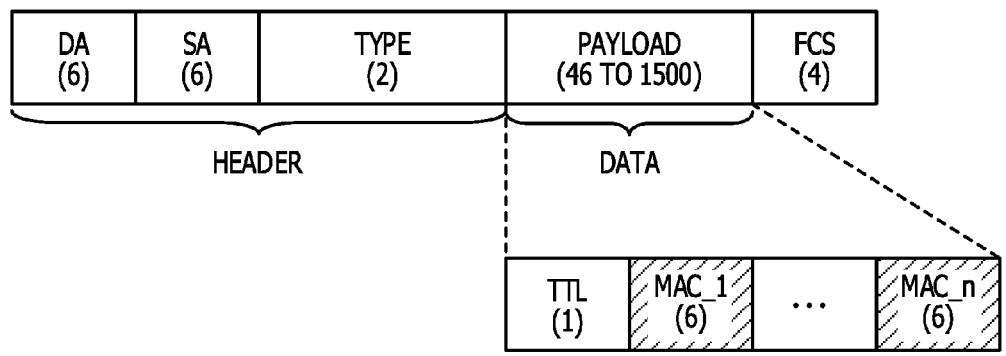
FIG. 16 is a diagram illustrating an example of a format of a loop search frame.

FIG. 16 is a diagram illustrating an example of a format of a loop search frame used in the second embodiment. The loop search frame includes a header, data (payload), and an FCS. Information elements included in the header and the FCS are similar to the information elements included in the header and the FCS of the loop monitoring frame and the loop search frame used in the first embodiment. In the second embodiment, the payload of the loop search frame includes a time to live (TTL) and an arbitrary number of MAC addresses. An initial value of the TTL in the payload is set by the loop searching unit 62 in the relay device 10 that generates the loop search frame. The TTL indicates a value allowed as a number of times that the loop search frame is transferred. The TTL can be set to be a plurality of arbitrary values. In the following example, the TTL assumes a value of 2 to 255. When receiving the loop search frame, each relay device 10 broadcasts the frame after the value of the TTL is changed to a value obtained by decrementing the value of the TTL by one and the MAC address of the own node is added to the payload. A relay device 10 that receives the loop search frame with TTL=1 discards the loop search frame. This may prevent congestion due to multiplication of the loop search frame also in a loop path not including the relay device 10 as the transmission source of the loop search frame as in the loop path passing through the nodes N3 and N5 to N7 in FIG. 15.

Figure 17:
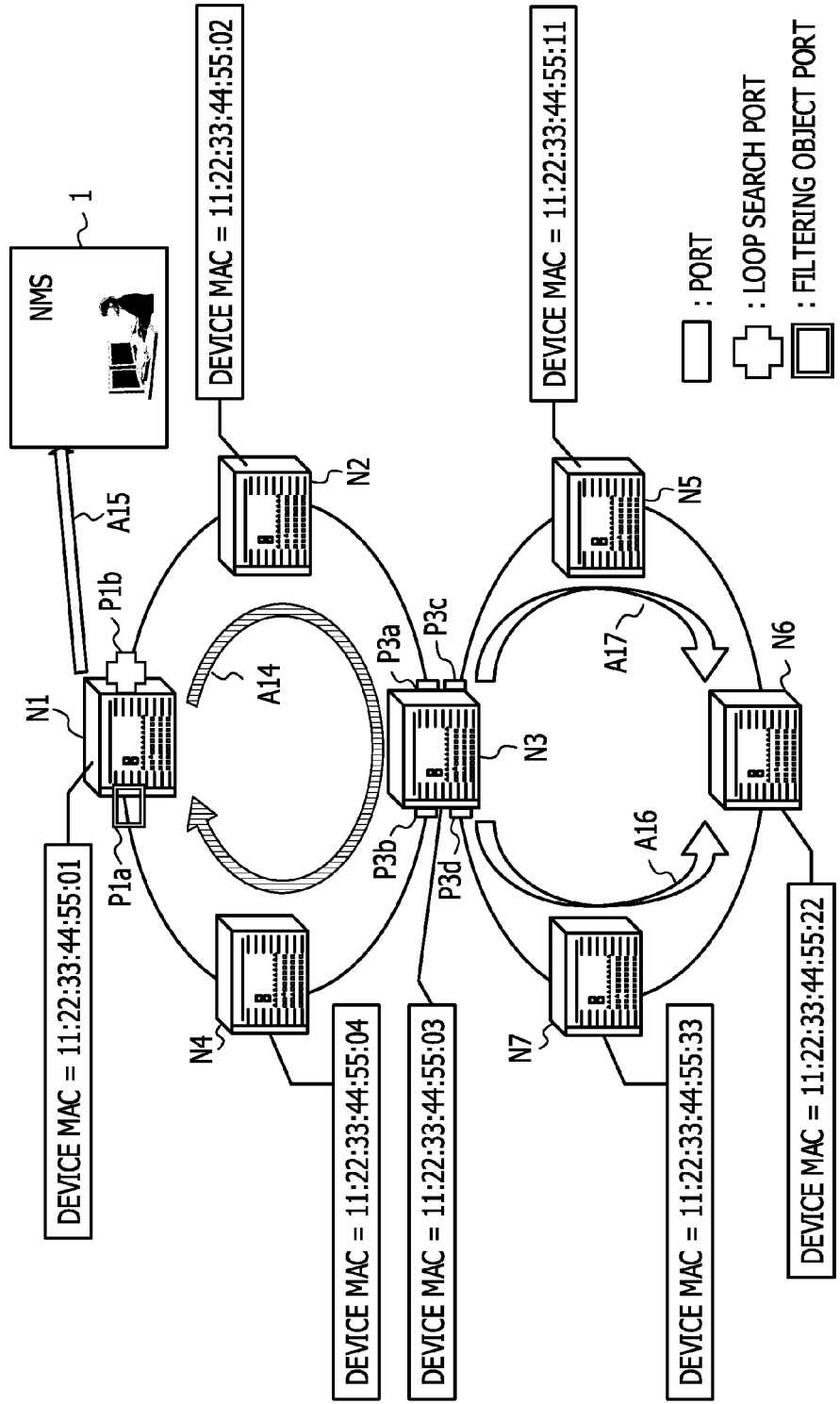
FIG. 17 is a diagram illustrating an example of a search for loop paths in the second embodiment.

FIG. 17 is a diagram illustrating an example of a search for loop paths in the second embodiment. FIG. 18 is a diagram illustrating an example of a loop search frame. An example of a search for loop paths in the second embodiment will be described in the following in separate sections on a case of a shortest loop including the transmission source of the loop search frame and a case of a network in which a loop path not including the transmission source of the loop search frame can occur. In the second embodiment, the value of a type in the loop search frame is set to be 0xA0A0.

(a1) Processing in the Shortest Loop Including the Transmission Source of the Loop Search Frame Processing performed in the shortest loop including the transmission source of the loop search frame will be described with reference to arrows A14 and A15 in FIG. 17. First, after the detection of the loop, the loop searching unit 62_1 of the node N1 sets the port P1a as a filtering object port because the port P1a is a loop detecting port.

Next, the loop searching unit 62_1 generates a loop search frame F21 (FIG. 18). In FIG. 18, because of space limitations, a transmission source MAC address is denoted as SA. However, in any one of frames F21 to F26, the transmission source MAC address is the address of the node N1 (11:22:33:44:55:01). As indicated by F21 in FIG. 18, data in the loop search frame F21 generated by the loop searching unit 62_1 includes the address of the node N1 (11:22:33:44:55:01). The loop searching unit 62_1 sets the TTL to four. The loop searching unit 62_1 outputs the loop search frame F21 to the transmitting unit 33_1 together with information designating the port P1b as an output port. The transmitting unit 33_1 transmits the loop search frame F21 from the port P1b. Therefore, the loop search frame F21 is transmitted from the node N1 to the node N2 as indicated by the arrow A14 in FIG. 17.

The loop searching unit 62_2 of the node N2 obtains the loop search frame F21 via the receiving unit 31_2 and the sorting unit 32_2. The loop searching unit 62_2 determines whether the transmission source MAC address of the loop search frame F21 is the address assigned to the node N2. In this case, the transmission source address of the loop search frame F21 is the address of the node N1. The loop searching unit 62_2 next determines whether a value obtained by decrementing the TTL of the loop search frame F21 by one is positive. When the value obtained by decrementing, by one, the TTL in the received frame in which the node N2 is not the transmission source is not positive, the loop searching unit 62_2 discards the received loop search frame. In this case, the TTL in the loop search frame F21 is four, and thus the TTL after the decrement is three. Because the value of the TTL after the decrement is positive, the loop searching unit 62_2 adds the MAC address of the node N2 (11:22:33:44:55:02) to the data in the loop search frame F21. The loop searching unit 62_2 further changes the TTL in the loop search frame to the value after the decrement. A loop search frame F22 (FIG. 18) is therefore obtained by the processing of the loop searching unit 62_2. The loop searching unit 62_2 requests the transmitting unit 33_2 to broadcast the loop search frame F22. The loop search frame F22 is broadcast from the node N2 by the processing of the transmitting unit 33_2. Hence, the node N3 receives the loop search frame F22 from the node N2.

The processing performed when the node N3 receives the loop search frame F22 is similar to the processing performed when the node N2 receives the loop search frame F21. The transmission source MAC address of the loop search frame F22 is not the address assigned to the node N3. The loop searching unit 62_3 therefore sets TTL=2 by decrementing the TTL by one. Because the value of the TTL after the decrement is positive, the loop searching unit 62_3 generates a loop search frame F23 (FIG. 18) by adding the MAC address of the node N3 (11:22:33:44:55:03) to the data in the loop search frame F22. The loop searching unit 62_3 thereafter requests the transmitting unit 33_3 to broadcast the loop search frame F23. Hence, each of the nodes N4, N5, and N7 receives the loop search frame F23 from the node N3.

The node N4 also performs processing similar to the processing performed when the node N2 and the node N3 receive the loop search frame. The transmission source MAC address of the loop search frame F23 is not the MAC address of the node N4. The loop searching unit 62_4 therefore sets TTL=1 by decrementing the TTL by one. Because the value of the TTL after the decrement is positive, the loop searching unit 62_4 generates a loop search frame F24 (FIG. 18) by adding the MAC address of the node N4 (11:22:33:44:55:04) to the data in the loop search frame F23. The loop searching unit 62_4 requests the transmitting unit 33_4 to broadcast the loop search frame F24. As a result, as indicated by the arrow A14, the loop search frame F24 arrives at the node N1.

The port P1a of the node N1 is a filtering object port. Hence, among frames that arrive at the port P1a, a frame in which the value of the type field is the value (0xA0A0) indicating the loop search frame is not discarded. The loop search frame F24 is therefore received by the node N1. The loop searching unit 62_1 obtains the loop search frame F24 via the receiving unit 31_1 and the sorting unit 32_1. Because the transmission source MAC address of the loop search frame F24 is the address assigned to the node N1, the loop searching unit 62_1 determines that the frame transmitted to the node N1 through the loop path is received. Accordingly, processing similar to the processing of the transmission source of the loop search frame in the first embodiment is performed. That is, the network monitoring system 1 is notified that the nodes whose identifying information is included in the payload of the loop search frame F24 are included in the loop. The arrow A15 in FIG. 17 indicates that the node N1 notifies the network monitoring system 1 of the addresses of the relay devices 10 included in the loop. The node N1 discards the loop search frame. After notifying the network monitoring system 1 of the result of the search for one loop path, the relay device 10 resolves the loop in the ring type network including the nodes N1 to N4 by shutting down the loop detecting port.

(a2) Processing in the Network in which a Loop Path not Including the Transmission Source of the Loop Search Frame Occurs Communication between the nodes N3 and N5 to N7 can cause a loop not including the node N1. Accordingly, referring to FIG. 17 and FIG. 18, description will be made of a flow of the frame which flow is indicated by an arrow A16 as an example of processing of the frame transmitted from the node N1 on a loop path not including the transmission source of the loop search frame.

As described above with reference to the arrow A14 in FIG. 17, the loop search frame F23 (FIG. 18) in which the node N1 is designated as the transmission source is transmitted from the port P3d by the broadcasting of the loop search frame at the node N3. The node N7 therefore receives the loop search frame F23.

The node N7 also performs processing similar to the processing performed when the node N3 receives the loop search frame. That is, the loop searching unit 62_7 obtains the loop search frame F23 via the receiving unit 31_7 and the sorting unit 32_7. The transmission source MAC address of the loop search frame F23 is not the MAC address of the node N7. The loop searching unit 62_7 therefore sets TTL=1 by decrementing the TTL by one. Because the value of the TTL after the decrement is positive, the loop searching unit 62_7 generates a loop search frame F25 (FIG. 18) by adding the MAC address of the node N7 (11:22:33:44:55:33) to the data in the loop search frame F23. The loop searching unit 62_7 requests the transmitting unit 33_7 to broadcast the loop search frame F25. Thus, as indicated by the arrow A16, the loop search frame F25 arrives at the node N6.

The loop searching unit 62_6 of the node N6 obtains the loop search frame F25 via the receiving unit 31_6 and the sorting unit 32_6. The transmission source MAC address of the loop search frame F25 is not the MAC address of the node N6. The loop searching unit 62_6 therefore sets TTL=0 by decrementing the TTL by one. Because the value of the TTL after the decrement is not positive, the loop searching unit 62_6 discards the loop search frame F25. Therefore, as indicated by the arrow A16, the frame flow caused by the loop search frame transmitted from the node N1 stops at the node N6, so that the loop search frame is not transferred in a loop manner in the network in a ring form which network includes the nodes N3 and N5 to N7.

Processing similar to the processing in the case of the arrow A16 is performed also for a frame flow indicated by an arrow A17 in FIG. 17. The loop search frame F23 (FIG. 18) in which the node N1 is designated as the transmission source is transmitted from the port P3c by the broadcasting of the loop search frame at the node N3. The loop search frame F23 arrives at the node N5. The node N5 performs processing similar to the processing in the node N7. The node N5 generates a loop search frame F26 (FIG. 18) including the MAC address of the node N5. The value of the TTL in the loop search frame F26 is one. Hence, the loop search frame F26 is transmitted to the node N6.

When the node N6 receives the loop search frame F26, the node N6 processes the loop search frame F26 as in the case of the loop search frame F25. The transmission source MAC address of the loop search frame F26 is not the MAC address of the node N6. The loop searching unit 62_6 therefore sets TTL=0 by decrementing the TTL by one. Because the value of the TTL after the decrement is zero, the loop searching unit 62_6 discards the loop search frame F26. Therefore, as indicated by the arrow A17, also in the case where the frame originating from the loop search frame transmitted from the node N1 is transmitted to the network in a ring form which network includes the nodes N3 and N5 to N7 via the port P3c of the node N3, the frame is discarded by the node N6. Thus, according to the second embodiment, the occurrence of the loop caused by the loop search frame may be prevented even in the network not including the transmission source of the loop search frame.

As described earlier, each of the ring type networks includes the relay device 10 set to detect a loop and identify devices in a loop path. The set relay device 10 can perform processing similar to the processing in the node N1. For example, suppose that in FIG. 17, as with the node N1, the node N6 is set to detect a loop and search for a loop path. Then, the node N6 detects a loop that has occurred in the network including the nodes N3 and N5 to N7, and identifies the loop path. After identifying the loop path, the node N6 resolves the loop by shutting down the loop detecting port.

Figure 19:
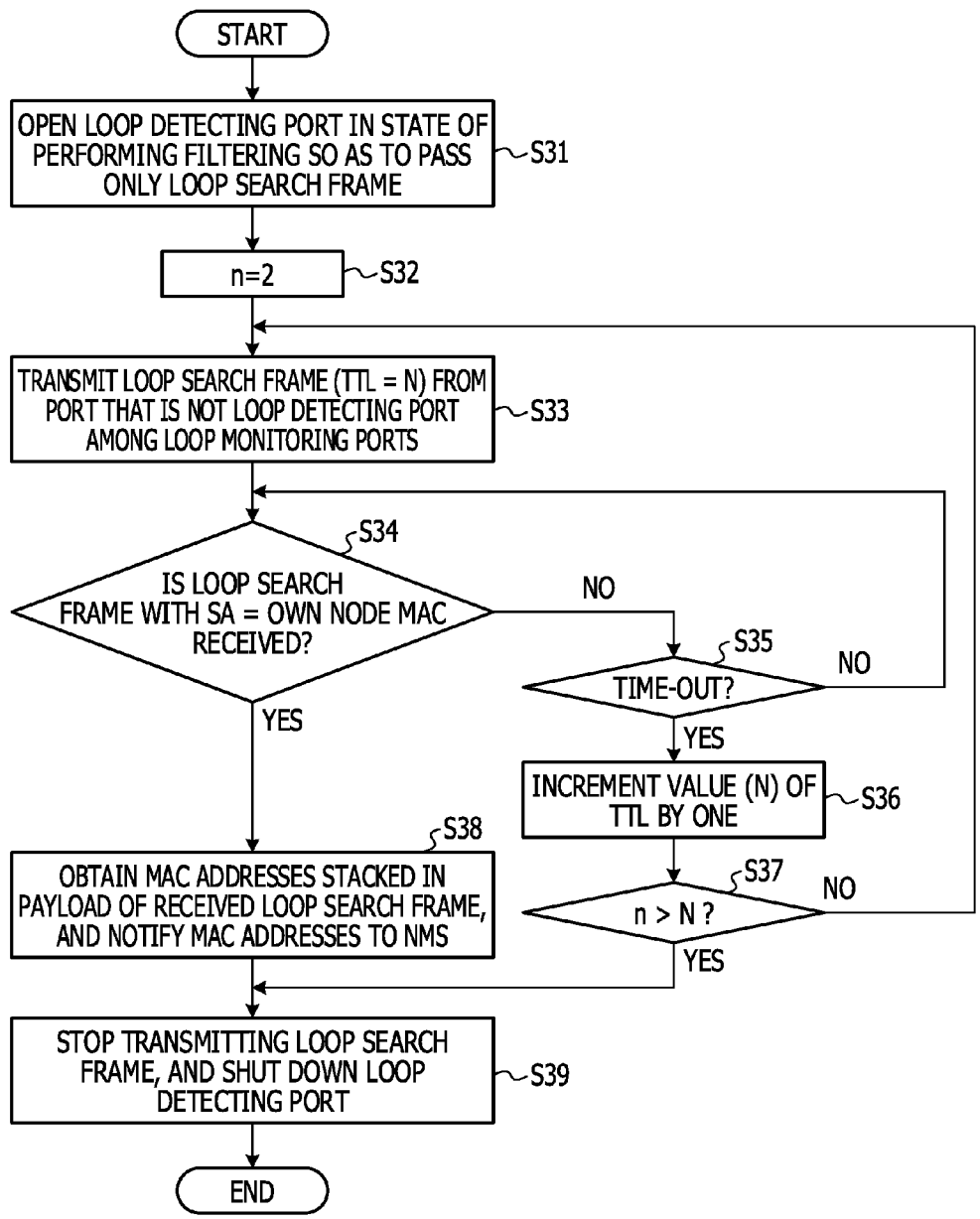
FIG. 19 is a flowchart illustrating an example of operation of a relay device that generates a loop search frame.

FIG. 19 is a flowchart illustrating an example of operation of a relay device that generates a loop search frame. The relay device described with reference to FIG. 19 may be the relay device 10 illustrated in FIG. 3. Processing illustrated in FIG. 19 is processing in the relay device 10 that has detected a loop, and corresponds to the processing performed in the node N1 in FIG. 17. In FIG. 19, a constant N and a variable n are used. The variable n is the value of a TTL set in the generated loop search frame. The constant N is an upper limit value of the TTL set in the loop search frame.

First, notified that the loop is detected, the loop searching unit 62 sets the loop detecting port to perform filtering so as to receive only the loop search frame, and then opens the loop detecting port (S31). Next, the loop searching unit 62 sets the variable n to 2 (S32). Next, the loop searching unit 62 transmits the loop search frame in which the value of the TTL is set at n from a port other than the loop detecting port among loop monitoring ports (S33). In this case, the transmission source MAC address of the loop search frame is the address assigned to the relay device 10 that generates the loop search frame. The loop searching unit 62 thereafter determines whether the loop search frame whose transmission source MAC address coincides with the MAC address of the own node (own node MAC) is received (S34). The loop searching unit 62 continues the determination in S34 until the transmission cycle of the loop search frame has passed or until the loop search frame whose transmission source MAC address coincides with the MAC address of the own node is received (No in S34 and S35). In FIG. 19, the passage of the transmission cycle of the loop search frame is expressed as a time-out.

It is determined that a time-out has occurred when the loop search frame whose transmission source MAC address is set to be the MAC address of the own node is not received during the transmission cycle of the loop search frame (Yes in S35). The loop searching unit 62 then increments the value of the TTL (variable n) by one (S36). The loop searching unit 62 thereafter determines whether or not the variable n is larger than the constant N (S37). When the loop searching unit 62 determines that the variable n is equal to or smaller than the constant N (No in S37), the loop searching unit 62 returns to S33 to transmit the loop search frame in which n after the increment is set as the TTL. When determining that the variable n is larger than the constant N (Yes in S37), on the other hand, the loop searching unit 62 stops the transmission of the loop search frame, and makes the setting unit 22 shut down the loop detecting port (S39).

Determining in S34 that the loop search frame whose transmission source MAC address is set to be the MAC address of the own node is received (Yes in S34) means that the loop searching unit 62 has obtained a list of relay devices 10 included in the loop by the loop search frame. The loop searching unit 62 notifies the monitoring unit 43 of address information included in the payload of the loop search frame. Notified of the address information, the monitoring unit 43 notifies the network monitoring system 1 of the list of the relay devices 10 included in the loop (S38). Thereafter, the loop searching unit 62 stops the transmission of the loop search frame, and makes the setting unit 22 shut down the loop detecting port (S39).

Figure 20:
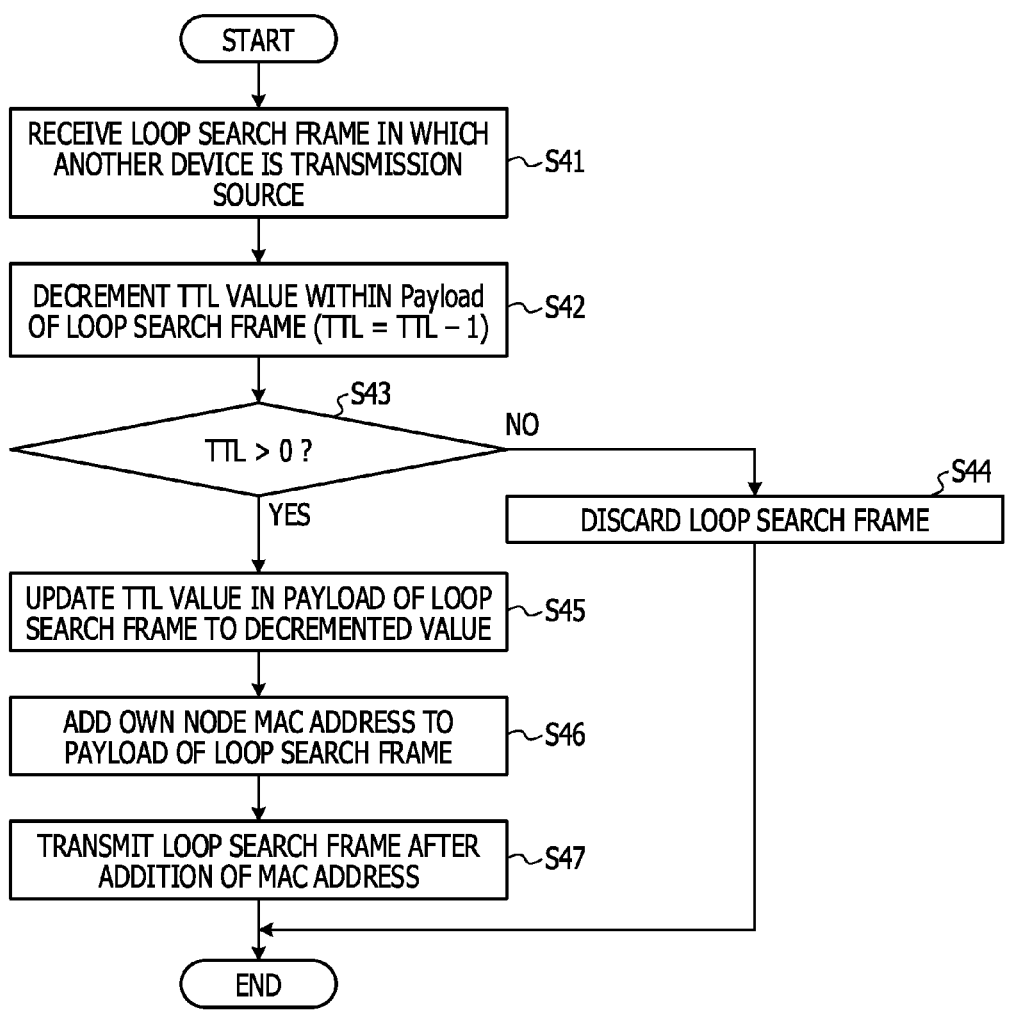
FIG. 20 is a flowchart illustrating an example of operation of a relay device that receives a loop search frame.

FIG. 20 is a flowchart illustrating an example of operation of a relay device that receives a loop search frame. The relay device described with reference to FIG. 20 may be the relay device 10 illustrated in FIG. 3. FIG. 20 is of assistance in explaining an example of processing in a relay device 10 other than the transmission source of the loop search frame.

First, the relay device 10 receives the loop search frame generated by another relay device 10 (S41). Because the transmission source of the loop search frame is not the own node, the loop searching unit 62 decrements the value of a TTL within the payload of the loop search frame by one (S42). Next, the loop searching unit 62 determines whether the value of the TTL after the decrement (n) is larger than zero (S43). When determining that the TTL is equal to or less than zero (No in S43), the loop searching unit 62 discards the loop search frame, and ends the processing (S44).

When determining that the value of the TTL after the decrement is larger than zero (Yes in S43), on the other hand, the loop searching unit 62 updates the value of the TTL in the payload of the loop search frame to the decremented value (n) (S45). Further, the loop searching unit 62 adds the MAC address of the own node to the payload of the loop search frame (S46). The relay device 10 next transmits the loop search frame after the addition of the MAC address of the own node (S47).

Thus, in the second embodiment, even when a loop occurs in the path not including the relay device 10 as the transmission source of the loop search frame, the occurrence of a loop caused by the loop search frame may be prevented. Further, also in the second embodiment, as in the first embodiment, information on the relay devices 10 included in the loop path can be obtained easily and efficiently by using the loop search frame.

Third Embodiment

Figure 21:
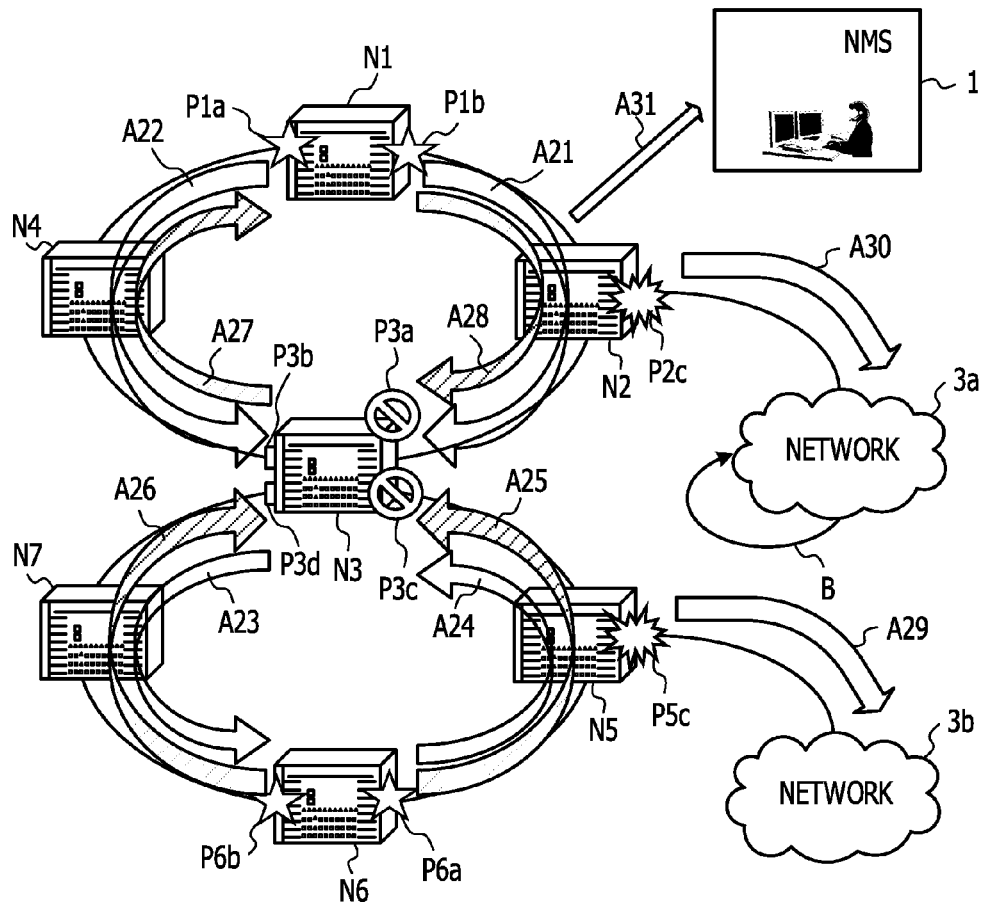
FIG. 21 is a diagram illustrating an example of an occurrence of a loop in a network in which relay devices according to the embodiments are not installed.

FIG. 21 is a diagram illustrating an example of an occurrence of a loop in a network in which relay devices according to embodiments are not installed. A network illustrated in FIG. 21 includes nodes N1 to N7. The nodes N1, N2, N5, and N6 monitor for a loop and search for a path at a time of occurrence of a loop. The node N1 sets ports P1a and P1b as monitoring objects. The node N6 sets ports P6a and P6b as monitoring objects. The node N2 sets a port P1c coupled to a network 3a as a monitoring object. However, the node N2 does not set ports coupled to other relay devices 10 as monitoring objects. As with the node N2, the node N5 sets a port P5c coupled to a network 3b as a loop monitoring object. However, the node N5 does not monitor ports coupled to other relay devices 10. The node N3 sets ports P3a and P3c as blocking ports. However, the node N3 does not set ports P3b and P3d as blocking ports.

The node N1 transmits a loop monitoring frame from the ports P1a and P1b. Also in the third embodiment, processing for the loop monitoring frame in each relay device 10 is similar to the processing in the first and second embodiments. The loop monitoring frame transmitted from the port P1b is transmitted in a path indicated by an arrow A21, and arrives at the blocking port (P3a) of the node N3. Therefore, the loop monitoring frame is not broadcast from the node N3.

Meanwhile, the loop monitoring frame transmitted from the port P1a arrives at the port P3b of the node N3 in a path indicated by an arrow A22, and is transmitted from the port P3d to the node N7. The loop monitoring frame transmitted from the port P1a thereafter arrives at the blocking port (P3c) of the node N3 in a path indicated by arrows A23 and A24. Therefore, the loop monitoring frame is not broadcast from the node N3.

As with the node N1, the node N6 also transmits a loop monitoring frame from the ports P6a and P6b. The loop monitoring frame transmitted from the port P6a arrives at the blocking port of the node N3 in a path indicated by an arrow A25. Therefore, the loop monitoring frame is not broadcast from the node N3. The loop monitoring frame transmitted from the port P6b arrives at the blocking port of the node N3 in a path indicated by arrows A26, A27, and A28. Thereafter, the loop monitoring frame is not broadcast from the node N3. Thus, no loop has occurred in the network including the nodes N1 to N7.

A loop monitoring frame transmitted from the port P5c of the node N5 is transmitted in a path indicated by an arrow A29. A loop monitoring frame transmitted from the port P2c of the node N2 is transmitted in a path indicated by an arrow A30.

Thereafter, as indicated by an arrow B in FIG. 21, a loop occurs in the network 3a. The network 3a includes no relay device 10. However, when the loop occurs, the node N2 detects the occurrence of the loop by receiving the loop monitoring frame transmitted from the port P2c. The network 3a including no relay device 10 is registered as the coupling destination of the port P2c in the loop searching unit 62_2 of the node N2 in advance. Accordingly, when the port P2c is a loop detecting port, the loop searching unit 62_2 shuts down the port P2c without making a loop search, and requests the monitoring unit 43 to perform processing that notifies the occurrence of the loop to a network monitoring system 1. The occurrence of the loop in the network 3a is notified to the network monitoring system 1 by the processing of the monitoring unit 43 and the transmitting and receiving unit 41 (arrow A31).

Thus, a relay device 10 monitors a port coupled to a network 3 including no relay device 10, and may thereby prevent frames from flowing in from the network 3 when a loop occurs in the network 3. This may prevent a degradation in communication quality in the network including the relay devices 10 due to the occurrence of the loop in the network 3 including no relay device 10.

[Modifications]

Embodiments are not limited to the foregoing, but are susceptible of various modifications. A few examples thereof will be described in the following.

The above description has been made by taking as an example a case where relay devices 10 are coupled to each other in a ring form. However, a network including relay devices 10 may be in an arbitrary form other than a ring form.

In the third embodiment, when a network 3 including no relay device 10 is not registered in the loop searching unit 62, the loop searching unit 62 transmits a loop search frame in response to the detection of a loop at a port coupled to the network 3. In this case, devices in the network 3 do not perform the processing of adding a MAC address to the loop search frame. The relay device 10 therefore obtains the loop search frame not including addresses other than the address of the relay device 10. The loop searching unit 62 then determines that the loop detecting port is coupled to the network 3 including no relay device 10. Then, the loop searching unit 62 shuts down the loop detecting port, and performs processing that reports to the network monitoring system 1.

A case where the relay device 10 that transmits a loop search frame detects the loop of the nodes N1 to N4 has been illustrated with reference to FIG. 17 and the like in the second embodiment. However, the relay device 10 can detect the occurrence of a loop of an arbitrary size which loop includes the own node, and identify devices in the loop path. For example, in FIG. 17, when the node N1 transmits a loop search frame with TTL=8, the loop search frame may arrive at the node N3 again via the nodes N1, N2, N3, N7, N6, and N5. The value of the TTL in the loop search frame that has arrived at the node N3 from the node N5 is two. The loop search frame is thus broadcast from the node N3. As a result, the node N1 can detect a loop that returns to the node N1 via the nodes N1, N2, N3, N7, N6, N5, N3, and N2.

The above examples have been described by taking as an example a case where the destinations of the loop monitoring frame and the loop search frame are set to be a broadcast address. However, the destinations of these frames may be a multicast address including relay devices 10 in a range determined in advance. The multicast address is determined for each relay device 10 according to objects that monitor the occurrence of a loop. When the multicast address is used, the multicast address to be set as the destinations of the frames is registered in the loop detecting unit 61 and the loop searching unit 62 in advance.

In order to decrease the number of frames in the network after a loop is detected, the loop searching unit 62 may wait for a certain period before setting the loop detecting port as a filtering object port again. The certain period can be for example a time expected to be taken to converge congestion in the network which congestion is caused by the loop after the loop is detected. The filtering object port discards frames other than the loop search frame. Therefore, the loop searching unit 62 may set the loop detecting port as a filtering object port immediately after the detection of the loop.

Further, the value of the type in the loop monitoring frame may be set to be a different value in each relay device 10. When the value of the type in the loop monitoring frame differs for each relay device 10, the loop monitoring frame is treated in a similar manner to ordinary frames in the relay devices 10 other than the transmission source of the loop monitoring frame.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network monitoring method executed by a plurality of relay devices within a network, the network monitoring method comprising:
   stopping, by a first relay device among the plurality of relay devices, transfer of a data frame received via a port at which a loop in the network is detected when the loop is detected;
   transmitting a first search frame configured to identify one or more relay devices included in a path in which the loop has occurred;
   receiving, by a second relay device among the plurality of relay devices, the first search frame;
   transmitting a second search frame obtained by storing identifying information identifying the second relay device in a data region of the first search frame; and
   identifying, by the first relay device, the one or more relay devices included in the loop using information included in the data region of a third search frame in which the first relay device is a transmission source, the third frame being generated from the second frame by passing through one or more relay devices within the network, when the third search frame is received;
   transmitting, by the first relay device, a monitoring frame configured to monitor a state of the network from a monitoring port;
   setting, as a detecting port detecting the loop, a port receiving the monitoring frame in which the first relay device is designated as a transmission source, and disabling the detecting port until congestion in the network is converged, the congestion in the network being caused by the loop;
   changing a setting of the detecting port so as to receive a frame used to search for a path of the loop when the congestion is converged; and
   outputting the first search frame from the monitoring port.

2. The network monitoring method according to claim 1, wherein the third search frame is transmitted as the first search frame from the first relay device and includes one or more identification information corresponding to one or more relay devices through which the third search frame passed before returning to the first relay device.

3. The network monitoring method according to claim 1, further comprising:
   discarding, by the first relay device, the received monitoring frame when the monitoring frame is received via the detecting port;
   notifying a monitoring system that is coupled to the network and monitors the network that the loop is detected; and
   stopping transmission of a new monitoring frame from the first relay device, and shutting down the detecting port.

4. The network monitoring method according to claim 1, further comprising:
   transmitting, by the first relay device, a new monitoring frame from the monitoring port again when the monitoring frame is not received via the detecting port within a given time after transmission of the monitoring frame.

5. The network monitoring method according to claim 1, wherein the data region of the first search frame includes a first value indicating a number of times of transfer before the first search frame is discarded, and the transmitting of the second search frame includes, when a second value obtained by decrementing the first value is a positive value, storing the second value as a number of times of transfer before the second search frame is discarded in a data region in the second search frame, the network monitoring method further comprising:

discarding, by one of the plurality of relay devices, a search frame in which one is designated as a number of times of transfer before the search frame is discarded, when the search frame is received.

6. The network monitoring method according to claim 5, further comprising:

setting, by the first relay device, the third value larger than the first value as a number of times of transfer before a third search frame is discarded, and then outputting the third search frame from a monitoring port, when a search frame in which the first relay device is a transmission source, is not received within a given time after transmission of the first search frame.

7. A network monitoring system, comprising:

a first relay device included in a network; and a second relay device included in the network and coupled to the first relay device;

wherein the first relay device stops transfer of a data frame received via a port at which a loop in the network is detected when the loop is detected, and the first relay device transmits a first search frame configured to identify one or more relay devices included in a path in which the loop has occurred, wherein the second relay device transmits a second search frame obtained by storing identifying information identifying the second relay device in a data region of the first search frame, when the first search frame is received, and wherein the first relay device identifies the one or more relay devices included in the loop using information included in the data region of a third search frame in which the first relay device is a transmission source, the third frame being generated from the second frame by passing through one or more relay devices within the network, when the third search frame is received, wherein the first relay device is configured to:

transmit a monitoring frame configured to monitor a state of the network from a monitoring port;

set, as a detecting port detecting the loop, a port receiving the monitoring frame in which the first relay device is designated as a transmission source;

disable the detecting port until congestion in the network is converged, the congestion in the network being caused by the loop;

change a setting of the detecting port so as to receive a frame used to search for a path of the loop when the congestion is converged; and output the first search frame from the monitoring port.

8. The network monitoring system according to claim 7, wherein the third search frame is transmitted as the first search frame from the first relay device and includes one or more identification information corresponding to one or more relay devices through which the third search frame passed before returning to the first relay device.

9. The network monitoring system according to claim 7, wherein the first relay device is configured to:

discard the received monitoring frame when the monitoring frame is received via the detecting port;

notify a monitoring system that is coupled to the network and monitors the network that the loop is detected; and stop transmission of a new monitoring frame from the first relay device, and shut down the detecting port.

* * * * *